US010722752B2

(12) United States Patent
Fima

(10) Patent No.: US 10,722,752 B2
(45) Date of Patent: *Jul. 28, 2020

(54) TREADMILL WITH LIGHTING AND SAFETY FEATURES

(71) Applicant: The Giovanni Project LLC, Carlsbad, CA (US)

(72) Inventor: Giovanni Raoul Fima, San Diego, CA (US)

(73) Assignee: The Giovanni Project LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/785,984

(22) Filed: Feb. 10, 2020

(65) Prior Publication Data

US 2020/0171353 A1 Jun. 4, 2020

Related U.S. Application Data

(63) Continuation-in-part of application No. 16/418,234, filed on May 21, 2019, now Pat. No. 10,556,168.

(Continued)

(51) Int. Cl.
*A63B 24/00* (2006.01)
*A63B 22/02* (2006.01)
(Continued)

(52) U.S. Cl.
CPC .......... *A63B 24/0087* (2013.01); *A63B 22/02* (2013.01); *A63B 24/0062* (2013.01);
(Continued)

(58) Field of Classification Search
CPC . A63B 22/02; A63B 24/0062; A63B 24/0087; A63B 71/0622; A63B 2207/02;
(Continued)

(56) References Cited

U.S. PATENT DOCUMENTS 4,411,424 A 10/1983 Barnett
4,519,603 A 5/1985 DeCloux
(Continued)

FOREIGN PATENT DOCUMENTS

CN 203507440 U 4/2014
CN 205665807 U 10/2016
(Continued)

OTHER PUBLICATIONS

"Operating and Maintaining the P30 Console" https://www.precor.com/sites/default/files/manuals/TRM_833_Manuals_EN.pdf Jun. 2011.
(Continued)

*Primary Examiner* — Joshua Lee
(74) *Attorney, Agent, or Firm* — Young Basile Hanlon & MacFarlane, P.C.

(57) ABSTRACT

A lighting system is described for a treadmill, the treadmill including a tread that rotates around a front axle and a rear axle, wherein the tread comprises slats each having a tread surface and an underside. The lighting system includes a light positioned on at least one slat, wherein the light is configured to emit light between the adjacent slats and a controller in communication with the light and configured to control the light.

19 Claims, 18 Drawing Sheets

Related U.S. Application Data

(60) Provisional application No. 62/919,155, filed on Feb. 28, 2019, provisional application No. 62/762,818, filed on May 21, 2018, provisional application No. 62/919,155, filed on Feb. 28, 2019.

(51) Int. Cl.
*A63B 71/06* (2006.01)
*H02K 7/18* (2006.01)

(52) U.S. Cl.
CPC ...... *A63B 71/0622* (2013.01); *A63B 2207/02* (2013.01); *A63B 2220/805* (2013.01); *A63B 2230/505* (2013.01); *H02K 7/1853* (2013.01)

(58) Field of Classification Search
CPC ........ A63B 2220/805; A63B 2230/505; H02K 7/1853
See application file for complete search history.

(56) References Cited

U.S. PATENT DOCUMENTS

| | | |
|---|---|---|
| 4,564,191 A | 1/1986 | Atkin |
| 4,927,136 A | 5/1990 | Leask |
| 5,207,621 A | 5/1993 | Koch et al. |
| 5,368,532 A | 11/1994 | Farnet |
| 5,385,520 A | 1/1995 | Lepine et al. |
| 5,492,513 A | 2/1996 | Wang |
| 5,584,779 A | 12/1996 | Knecht et al. |
| 5,769,755 A | 6/1998 | Henry et al. |
| 6,626,803 B1 | 9/2003 | Oglesby et al. |
| 6,682,461 B2 | 1/2004 | Wang et al. |
| 7,604,571 B2 | 10/2009 | Wilkins et al. |
| 7,736,278 B2 | 6/2010 | Lull et al. |
| 7,833,133 B2 | 11/2010 | Stewart et al. |
| 7,854,177 B2 | 12/2010 | Hamady |
| 7,922,625 B2 | 4/2011 | Grind |
| 8,192,329 B2 | 6/2012 | Saitou et al. |
| 8,221,292 B2 | 7/2012 | Barker et al. |
| 8,317,663 B2 | 11/2012 | Stewart et al. |
| 8,534,444 B2 | 9/2013 | Senger |
| 8,689,948 B2 | 4/2014 | Winkler |
| 8,784,278 B2 | 7/2014 | Flake et al. |
| 8,920,347 B2 | 12/2014 | Bayerlein et al. |
| 9,430,920 B2 | 8/2016 | Munro et al. |
| 9,604,099 B2 | 3/2017 | Taylor |
| 9,675,839 B2 | 6/2017 | Dalebout et al. |
| 9,694,234 B2 | 7/2017 | Dalebout et al. |
| 9,922,528 B2 | 3/2018 | Munro et al. |
| 9,981,157 B2 | 5/2018 | Bayerlein et al. |
| 10,052,518 B2 | 8/2018 | Lagree |
| 10,207,146 B2 | 2/2019 | Liao et al. |
| 10,493,349 B2 * | 12/2019 | Watterson .......... A63B 22/0285 |
| 2005/0039541 A1 * | 2/2005 | Kurono ................ A61B 5/1038 |
| | | 73/800 |
| 2006/0035757 A1 | 2/2006 | Flick et al. |
| 2007/0032353 A1 | 2/2007 | Wilkins et al. |
| 2007/0201727 A1 | 8/2007 | Birrell et al. |
| 2008/0001772 A1 | 1/2008 | Saito |
| 2009/0036272 A1 | 2/2009 | Yoo |
| 2010/0216599 A1 | 8/2010 | Watterson et al. |
| 2012/0010053 A1 | 1/2012 | Bayerlein et al. |
| 2016/0213976 A1 * | 7/2016 | So ....................... A63B 71/0622 |
| 2017/0106222 A1 | 4/2017 | Mayer et al. |
| 2017/0136289 A1 | 5/2017 | Frank |
| 2017/0266533 A1 * | 9/2017 | Dalebout ........... A63B 71/0622 |
| 2018/0140903 A1 * | 5/2018 | Poure ................ A63B 24/0075 |
| 2018/0308334 A1 | 10/2018 | Minocha |
| 2019/0168066 A1 | 6/2019 | Yoo et al. |
| 2019/0168067 A1 * | 6/2019 | Bates ....................... A63B 1/00 |
| 2019/0217182 A1 | 7/2019 | Kueker et al. |

FOREIGN PATENT DOCUMENTS

| | | |
|---|---|---|
| CN | 107029383 A | 8/2017 |
| CN | 108355304 A | 8/2018 |
| CN | 108905060 A | 11/2018 |
| CN | 109381837 A | 2/2019 |
| EP | 0858358 B1 | 9/2000 |
| EP | 2562666 A2 | 2/2013 |
| GB | 2467359 A | 8/2010 |
| KR | 200292457 Y1 | 10/2002 |
| KR | 200358992 Y1 | 8/2004 |
| KR | 20070012347 A | 1/2007 |
| KR | 20080016223 A | 2/2008 |
| KR | 101321182 B1 | 10/2013 |
| KR | 101345798 B1 | 12/2013 |
| KR | 101852748 B1 | 6/2018 |
| WO | 9952601 A1 | 10/1999 |
| WO | 2010124267 A1 | 10/2010 |
| WO | 2019028657 A1 | 2/2019 |

OTHER PUBLICATIONS

Simon Fraser University "Two-Axis Circular Treadmill for Human Perception" May 5, 2010 http://www.sfu.ca/~ber1/web/iSpaceMecha/ HoyleNaugleBrosasArzanpourWangRiecke_2010_CSME_ ConferencePaper_Two-Axis_Circular_Treadmill_for_Human_ Perception_and_Behaviour__Research_in_Virtual_Environments. pdf.

* cited by examiner

TREADMILL WITH LIGHTING AND SAFETY FEATURES

CROSS-REFERENCE TO RELATED APPLICATIONS

This application is a continuation-in-part of U.S. patent application Ser. No. 16/418,234 filed on May 21, 2019, which claims priority to and the benefit of U.S. Provisional Application No. 62/762,818, filed May 21, 2018 and U.S. Provisional Application No. 62/919,155, filed Feb. 28, 2019 the entire disclosures of which are hereby incorporated by reference.

This application claims priority to and the benefit of U.S. Provisional Application No. 62/919,155, filed Feb. 28, 2019 the entire disclosures of which are hereby incorporated by reference.

TECHNICAL FIELD

This disclosure relates to exercise equipment including motor driven and manual treadmills and to improvements thereof, and in particular, to exercise equipment with a slatted tread, and lighting systems mounted on the treads.

BACKGROUND

Exercise treadmills allow people to walk, jog, run, or sprint on a stationary machine with a moving tread. Treadmill treads can include a continuous belt or a slatted belt. The treads of both motorized treadmills that move the tread using a motor and manual treadmills that rely on the user to move the tread continue to move once a user of the treadmill has stepped off the tread. The moving tread can make it difficult for the user to continue using the treadmill once the user continues to operate the treadmill. Additionally, other individuals nearby the moving tread may step onto the tread unaware that it is moving. Motorized and manual treadmills also allow unauthorized users such as children or animals to step onto the tread during or after use by an authorized user. Further, motorized and manual treadmills do not provide an alert to nearby individuals that the tread is moving.

Motorized and manual treadmills also often display information to users using a display screen. Such displays may be ineffective means to relay information to the user of the treadmill or to observers of the user while the user is operating the treadmill.

SUMMARY

One aspect of this disclosure is a treadmill including a lighting system. The treadmill includes a tread that rotates around a front axle and a rear axle, wherein the tread comprises slats each having a tread surface and an underside, the tread configured with a space between adjacent slats or with adjacent slats contacting each other. The lighting system comprises a light positioned on at least one slat, wherein the light is configured to emit light in or between the adjacent slats and a controller in communication with the light and configured to control the light.

Another embodiment of a lighting system for a treadmill includes a tread comprising slats each having a tread surface, a leading edge and an underside, each slat attached at longitudinal ends to a respective belt that rotates on bearings around a front axle and a rear axle. The lighting system comprises a light attached to the leading edge of a respective slat such that each slat has a light and the light emits light between adjacent slats and a controller in communication with each light and configured to control at least one of on/off, color, brightness, and light emission frequency of each light.

The lighting system embodiments can further comprise a power rail positioned within the treadmill and extending along at least a portion of a length of the tread, wherein the power rail receives power from a power source. A contactor is attached to the underside of each slat, the power rail positioned such that each contactor contacts the power rail while the tread rotates, the contactor configured to supply power to the light when in contact with the power rail.

Also disclosed herein are embodiments of a braking system to assist a user during a time of rest while the user remains positioned on the treadmill. The braking system can be initiated based on signals received from weight sensors and the presence sensors.

Also disclosed herein are embodiments of a weight measurement system for a user of a treadmill to provide the user's weight to the user while the user is on the treadmill.

Also disclosed herein are embodiments of a non-contact temperature sensor that can read the user's body temperature and control aspects of the treadmill based on the temperature read or on the determination that a user in on the treadmill based on the temperature reading.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Described herein are devices, systems, and methods to improve the operation of both motorized and non-motorized treadmills. A locking system is described that may be configured to stop rotation of a treadmill tread after a user of the treadmill dismounts the treadmill. The locking system may prevent operation of the treadmill until the system determines that the next user is an authorized user. A braking system is described that may be configured to slow rotation of the tread when the user steps off of the tread and onto side rails of the treadmill. The braking system may allow free rotation of the tread when the system determines that the user has stepped back onto the tread. Treadmill lighting systems are also described. The lighting systems may alert individuals near the treadmill that the treadmill is operational. The lighting systems may also convey information to the user and observers of the user, including but not limited to the user's performance or biometric data.

Figure 1:
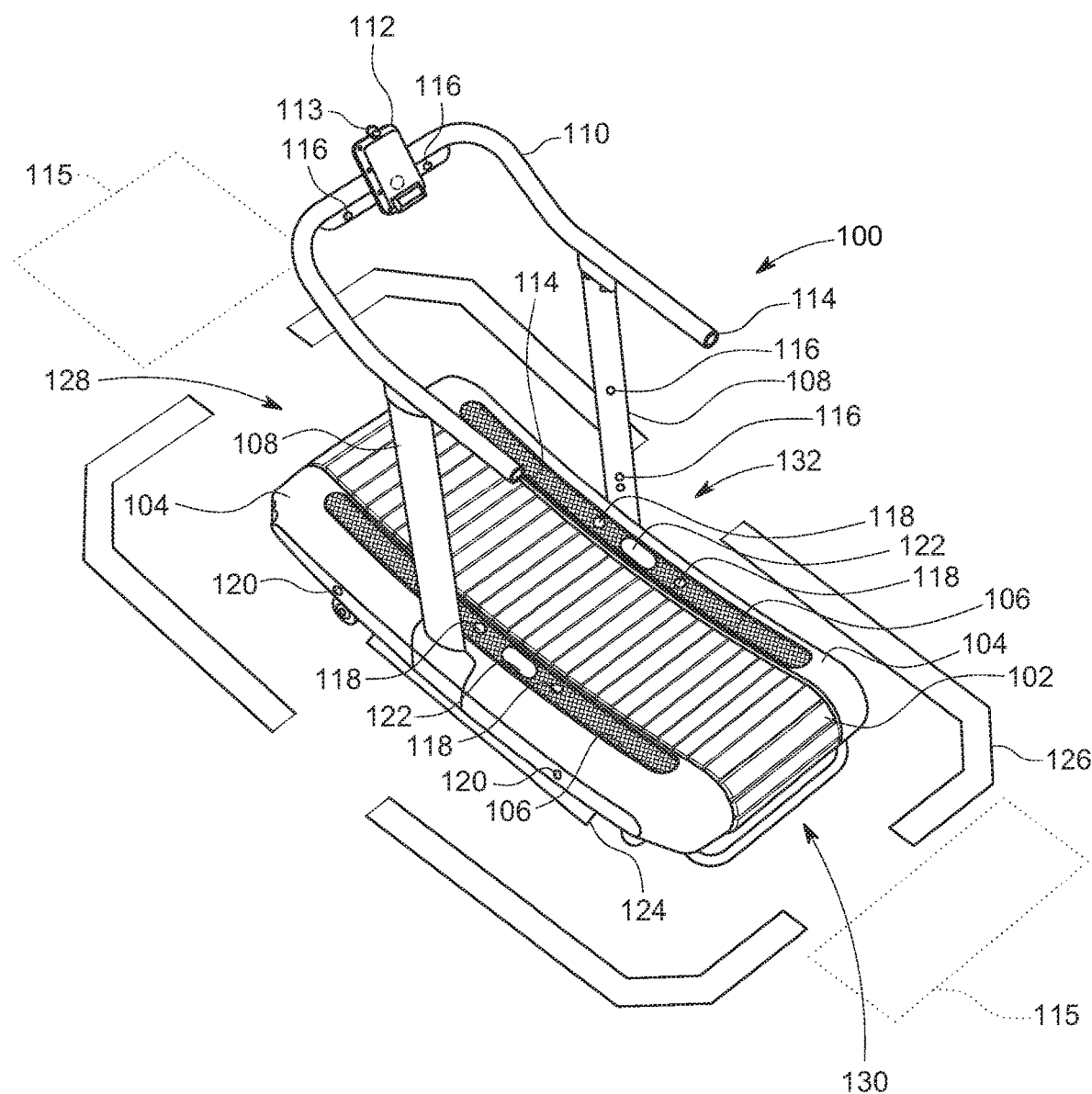
FIG. 1 is a top perspective view of a treadmill.

FIG. 1 is a top perspective view of a treadmill 100. The treadmill 100 may include a tread 102, side skirts 104, side rails 106, support members 108, a handrail 110, and a display 112. The treadmill 100 may also include one or more sensors, including but not limited to: infrared sensors, weight sensors, heartrate sensors, proximity sensors, or any other user detection or biometric sensor. In the illustrated, non-limiting example shown in FIG. 1, the treadmill 100 includes presence sensors 116, weight sensors 118, and proximity sensors 120.

The tread 102 is a moving surface traversed by a user operating the treadmill 100 and may include a continuous or segmented belt. In the illustrated, non-limiting example shown in FIG. 1, the tread 102 includes multiple slats. Longitudinal ends of each slat may be attached to a respective belt that rotates on fixed bearings (e.g., free-turning roller bearings) around a front axle and a rear axle. The slats may be configured with a space between adjacent slats or adjacent slats may contact each other. In other embodiments, the tread 102 may include a continuous rubber belt. The tread 102 may be actuated by a motor (a motorized treadmill) or may be moved under the power of the user (a manual treadmill, also referred to a non-motorized treadmill). The tread 102 may be supported by an underlying frame (e.g., a rigid metal frame, not shown in FIG. 1) such that the tread 102 may include a flat, curved, inclined, or declined shape or orientation. The tread 102 may include any other shape or orientation.

One or more side skirts 104 may be supported by the underlying frame on opposing sides of the tread 102. Each side skirt 104 may include a side rail 106 located on an upper surface of the side skirt 104. The side rails 106 may be integral with the side skirts 104 or may be separately located on the side skirts 104. The side rail 106 provides a surface for the user to safely stand on the treadmill 100. For example, the user may stand on the side rails 106 to mount or dismount the tread 102 or to mount or dismount the treadmill 100 entirely while the tread 102 is moving or stationary. The side rails 106 may extend along any length and width of the side skirts 104. Each of the side rails 106 may include a foot pad 122 designating one or more portions of the side rails 106 on which the user may stand. The foot pads 122 may be integral with the side rails 106 or may be separately located on the side rails 106. The foot pads 122 may be illuminated by lights located on, above, around, and/or underneath the foot pads 122 to indicate a location for the user to stand on the side rails 106. For example, an outline of a foot may be illuminated from below the side rail 106 using opaque or transparent plastic material through which undermounted lights shine. The foot pads 122 may be illuminated by the lights in response to detection of the user by the proximity sensors 120, the presence sensors 116, or an input on the display 112.

The support members 108 may include struts or any other structural member. The support members 108 may be coupled at one end to the underlying frame and/or the side skirts 104 and at the other end to the handrail 110. The support members 108 provide structural support to the handrail 110 and may be coupled to any portion of the underlying frame and/or side skirts 104 (e.g., in the middle of the treadmill 100, at either end of the treadmill 100, or at any location therebetween). Any number of support members 108 can be used. The frame 202 may support other components of the treadmill 100 including but not limited to axles, the side skirts 104, the side rails 106, the support members 108, and/or the handrail 110. The frame 202 may be made of any metal or any other material and may include one or more structural members.

The handrail 110 is coupled to the support members 108 and provides the user support while the user is operating the treadmill 100. For example, the user may hold onto the handrail 110 to mount or dismount the tread 102 or to mount or dismount the treadmill 100 entirely. The handrail 110, alone or in combination with other support members, supports the display 112. The display 112 may include any screen (e.g., touchscreen) located on the handrail 110. The display 112 may include a non-contact skin temperature sensor 113 that may be configured to measure the temperature of the user while the user is present on the treadmill without the need for the sensor to contact the user. The display 112 may display information to the user including but not limited to: user heartrate, temperature, user calories burned, or any other biometric data; distance traveled, distance remaining, workout duration, workout time remaining, tread speed, user running pace, or any other user performance information; and/or data associated with another treadmill user.

The treadmill 100 may include one or more systems to improve functionality of the treadmill 100 and to enhance the user's experience. The treadmill 100 may include a lock system configured to prevent rotation of the tread 102 while the treadmill 100 is not in use and to stop rotation of the tread 102 in response to the user dismounting the treadmill 100. The treadmill 100 may additionally include a braking system configured to slow rotation of the tread 102 while the treadmill 100 is being operated but no user is present on the tread 102. These systems may operate in response to signals received from the weight sensors 118 and the presence sensors 116.

One or more weight sensors 118 may be positioned such that weight and/or presence is detected when a user stands on the foot pads 122 and/or the side rails 106. The weight sensors 118 may include strain sensors or any sensor configured to detect the weight and/or presence of the user. For example, two strain sensors may be positioned under each foot pad 122 between the underlying frame and a bracket 200 shown in FIG. 2. The bracket 200 may be positioned under the foot pads 122 and the tread 102 to evenly distribute the user's weight to the weight sensors 118 while standing on the foot pads 122.

Figure 2:
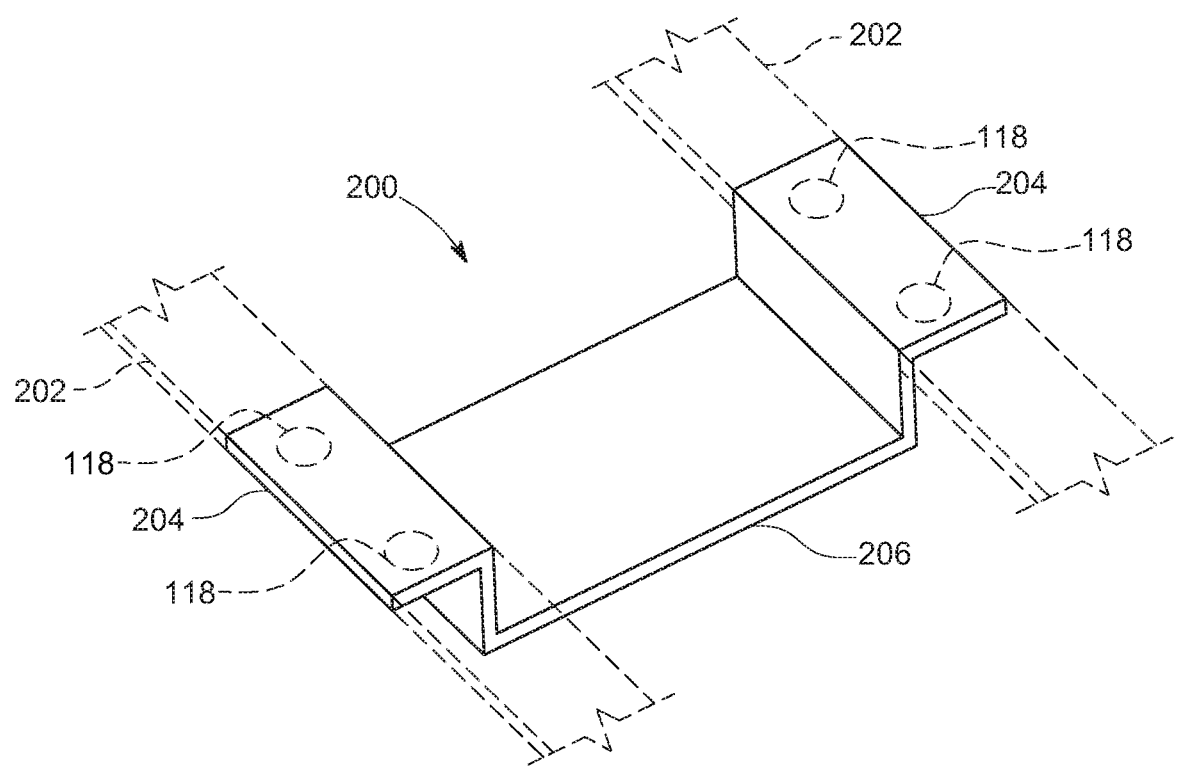
FIG. 2 is a top perspective view of a weight measurement or presence detection system of the treadmill.

In the illustrated, non-limiting example shown in FIG. 2, the bracket 200 has two opposing flanges 204 that overlay the strain gauges. A plate 206 extends between the flanges 204 to connect the flanges 204. In the illustrated, non-limiting example, the bracket 200 is U-shaped. The flanges 204 may be integral with the plate 206. For example, the bracket 200 may include a one-piece, pre-formed plastic or metal bracket. The bracket 200 can also include any configuration and/or orientation relative to the frame 202.

The weight sensors 118 may measure the weight of the user in response to the user stepping on the foot pads 122 overlying the bracket 200. In some embodiments, in response to a request by the user to measure the user's weight (e.g., using the display 112), the foot pads 122 may be illuminated by the lights to indicate to the user to stand on the foot pads 122. The user's weight may also be automatically measured in response to the weight sensors 118 detecting the user's presence on the foot pads 122. The user's weight may be displayed by the display 112.

Additionally and/or alternatively, the weight sensors 118 may detect the user's presence on the foot pads 122 and/or side rails 106. Additional weight sensors 118 may be positioned under the side rails 106 along a length of each side rail 106 for detecting presence. The treadmill 100 may be activated by a controller (later described with respect to FIG. 3) in response to the weight sensors 118 detecting the presence of the user on the foot pads 122 and/or the side rails 106. The treadmill 100 may also be deactivated by the controller in response to the weight sensors 118 detecting that no user is present on the foot pads 122 and/or the side rails 106.

One or more of the presence sensors 116 may be located on any portion of the support members 108, the handrail 110 or the display 112. The presence sensors 116 may include infrared sensors, ultrasonic sensors, LED linear light sensors, or any other sensor configured to detect a presence of the user on the treadmill 100 (e.g., standing between the support members 108, on the tread 102, the side rails 106, and/or the foot pads 122). The presence sensors 116 are positioned such that presence of a person near but not on the treadmill 100 will not be detected. The presence sensors 116 and the weight sensors 118 may operate together to detect the presence of the user on any portion of the treadmill 100.

In one example, a user initiation system and method include weight sensors 118 under the foot pads 122 and side rails 106, presence sensors 116, and a lock 316 (later described with respect to FIG. 3). The user initiation method includes a user approaching a treadmill 100 with the intent to use the treadmill 100 that is not currently in use. If motorized, the power is off. In order to enable use of the treadmill 100, the user steps on the foot pads 122 or side rails 106 to activate the weight sensors 118, which detect the user's presence. Additionally, the presence sensors 116 detect that the user is on an area of the treadmill 100 in which desire to use may be inferred. The non-contact temperature sensor 113 can also function as a presence sensor 116, as the detection of a temperature equivalent to that of a person will indicate that a user is present in an area of the treadmill in which use could be initiated. The combination of presence detected by both the weight sensors 118 and the presence sensors 116 can initiate unlocking of the lock 316, which when in the locking position, prevents rotation of the tread 102 in any direction. Additionally, the user initiation system and method may require that the user input a code prior to unlocking the lock 316, as will be described in more detail below. The user initiation system and method prevent the tread 102 from moving if a person or animal is on the treadmill 100 for reasons other than use.

Figure 3:
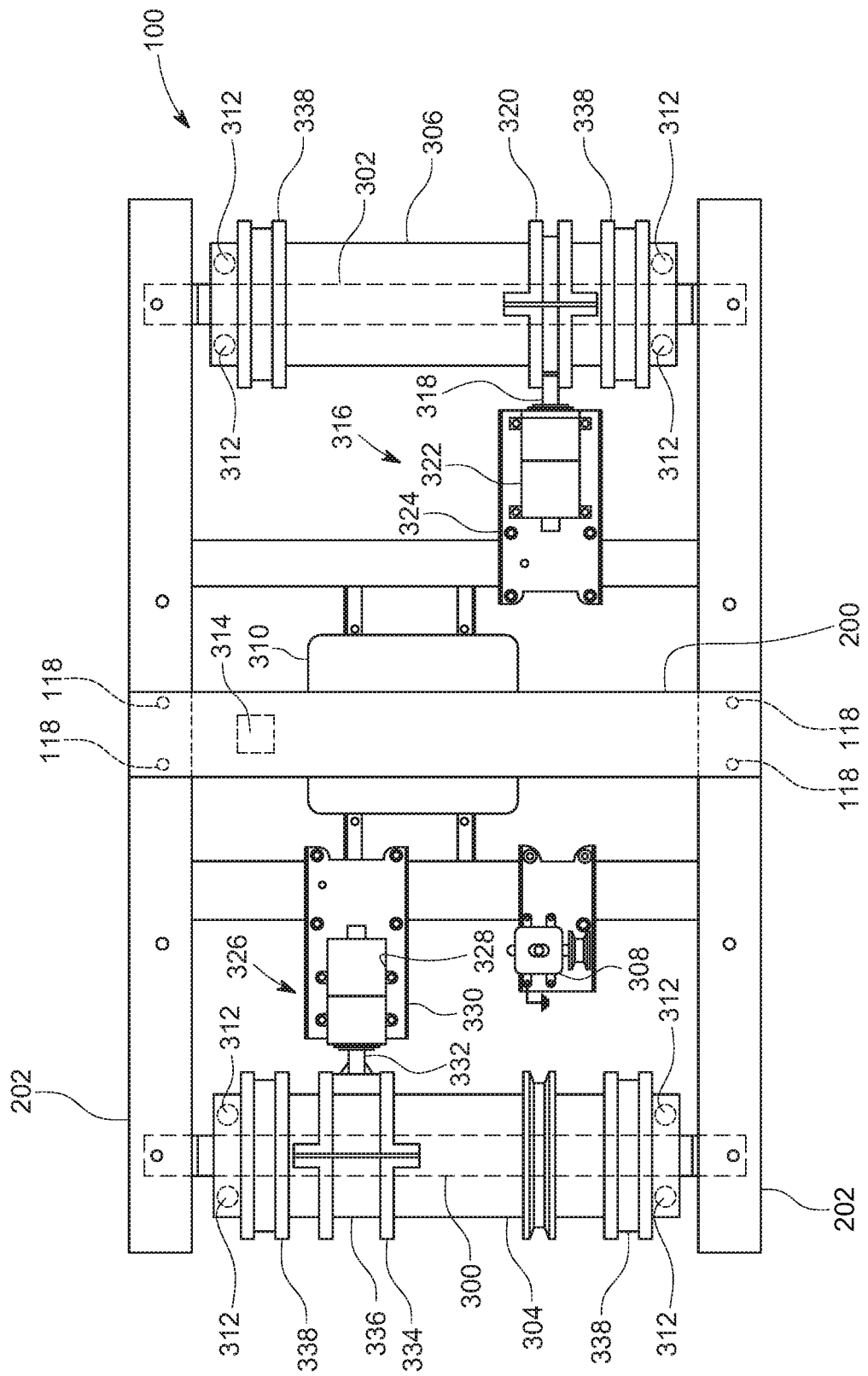
FIG. 3 is a diagram of internal components of the treadmill.

FIG. 3 is a diagram of internal components of the treadmill 100 including the lock and brake systems. In the illustrated, non-limiting example, the frame 202 includes two side members supporting the side skirts 104 and multiple cross-members extending between the side members. The support members 108 are coupled to the side members of the frame 202. The bracket 200 extends between the two side members of the frame 202. Weight sensors 118 are positioned on side members of the frame 202 underneath the flanges 204 of the bracket 200. Additional weight sensors 118 are positioned on the side members of the frame 202 underneath the side skirts 104. The treadmill 100 may include any number of weight sensors.

The treadmill 100 may include a front axle 300 and a rear axle 302. The front axle 300 and the rear axle 302 may be coupled to the frame 202 and may rotate relative to the frame 202 via bearings 312. The bearings 312 may allow two-way or one-way rotation of the front axle 300 and the rear axle 302. One-way rotation allows the tread 102 to rotate in only one direction and prohibits the tread 102 from moving "backwards" in the opposite direction.

The front axle 300 and the rear axle 302 may include a front axle drum 304 and a rear axle drum 306 respectively. The front axle drum 304 and the rear axle drum 306 may be fixed to the front axle 300 and the rear axle 302 respectively such that the front axle drum 304 and the rear axle drum 306 rotate with the front axle and the rear axle. The front axle drum 304 and the rear axle drum 306 may enlarge the diameter of the front axle 300 and the rear axle 302 respectively. The tread 102 may extend around the front axle drum 304 and the rear axle drum 306 such that rotation of the front axle drum 304 and/or the rear axle drum 306 results in rotation of the tread 102. In embodiments where the treadmill 100 is motorized, an electric motor (not shown) can be coupled to and may rotate the front axle 300, the rear axle 302, the front axle drum 304, and/or the rear axle drum 306 when activated. The electric motor may be coupled to the front axle 300, rear axle 302, front axle drum 304, or rear axle drum 306 via a belt or any other known means. For example, a belt may be attached to the tread on either side of the tread, the belt rotated around wheels 338 that are turned by the axles/drums. The electric motor may be directly coupled to the frame 202 or may be coupled to the frame 202 via a bracket or any other intermediate component.

In embodiments where the treadmill 100 is non-motorized, the treadmill 100 may include an electric generator 308. The electric generator 308 may convert rotation of the front axle 300, the rear axle 302, the front axle drum 304, and/or the rear axle drum 306 to electrical energy stored in the battery 310. The electric generator 308 may include a dynamo generator, a magneto motor, or any other device configured to convert rotation of the axles or axle drums to energy used to power the battery 310. The electric generator 308 may be coupled to the front axle 300, the rear axle 302, the front axle drum 304, or the rear axle drum 306 via a belt or any other known means. The electric generator 308 may be directly coupled to the frame 202 or may be coupled to the frame 202 via a bracket or any other intermediate component.

The battery 310 may include a 12/24 VDC battery but may include one or more batteries of any type, operating at any voltage. The battery 310 may be directly coupled to the frame 202 or may be coupled to the frame 202 via a bracket or any other intermediate component. In other embodiments, the battery 310 may not be coupled to the frame 202. The battery 310 may be external to the treadmill 100 (e.g., the battery 310 may be located adjacent to the treadmill 100 or beneath the treadmill 100 in a space defined by the treadmill 100). The battery 310 may include a charging port to receive power from an external power source. The charging port may be used if the charge of the battery 310 is depleted. The battery 310 may power any electrical component described herein, including but not limited to any lights, sensors, displays, or controllers. Additionally and/or alternatively, the treadmill 100 may include a power cord configured to electrically connect to an external power source (e.g., a power socket). Power received by the power cord may be used to power the described electrical components.

The treadmill 100 may include a controller 314. The controller 314 may receive data from the presence sensors 116, the weight sensors 118, the proximity sensors 120, and/or any other sensors. The controller 314 may also be in electrical communication with any other described electrical component, including but not limited to the display 112, the electric generator 308, and the battery 310. The controller 314 may be coupled to any portion of the frame 202 but may be coupled to any portion of the treadmill 100. The controller 314 may be coupled to the frame 202 via a bracket or any other intermediate component or may be directly coupled to the frame 202 or to a surface of the battery 310 (e.g., a top surface of the battery 310).

The treadmill may also or alternatively include a wireless charging system including a battery having features similar to those of the battery, a power transmitter, and a power receiver, each in communication with the controller. The battery may be attached to any portion of the treadmill or may be placed near the treadmill. The power transmitter is configured to transmit power wirelessly from a power source (e.g., a wall outlet) to the power receiver via inductive coupling. In other embodiments, any suitable method of wireless power transfer may be used. The power receiver is configured to receive the power from the power transmitter and to supply the power to the battery for recharging.

The lock 316 is configured to automatically stop rotation of the tread 102 in any direction when the user is not present on the treadmill 100 (e.g., not present on the tread 102 or the side rails 106). Once the lock 316 is engaged, such as when the user steps off of the treadmill, the lock 316 may prevent rotation of the tread 102 in any direction until the user is again identified by presence with the weight sensors, infrared sensors and, in some embodiments, the entry of an identification code.

The lock 316 may include a locking member 318, a locking member receiver 320, an actuator 322, and an actuator bracket 324. In the illustrated, non-limiting example shown in FIG. 3, the locking member receiver 320 is coupled to the rear axle drum 306 and rotates with the rear axle drum 306. The locking member receiver 320 may be coupled to the rear axle drum 306 using keys, screws, nuts, bolts, rivets, welding, or any other means of attachment. In other embodiments, the locking member receiver 320 may be coupled to the front axle 300, the front axle drum 304, or the rear axle 302. The locking member receiver 320 is configured to receive the locking member 318. The locking member receiver 320 may include a cam or any other device capable of engaging with the locking member 318 to prohibit rotation of the front axle 300, rear axle 302, front axle drum 304, and/or the rear axle drum 306 in any direction.

The actuator 322 is configured to move the locking member 318 between a locked position and an unlocked position. The actuator 322 may include any type of spring, motor, solenoid, electric cylinder having an integrated motor, or any other device capable of moving the locking member 318 to engage the locking member receiver 320. The actuator 322 is coupled to the actuator bracket 324 using any described means of attachment. The actuator bracket 324 is coupled to the frame 202 using any described means of attachment. In other embodiments, the actuator 322 may be directly coupled to any portion of the frame 202.

The actuator 322 is configured to move the locking member 318 to engage the locking member receiver 320. The locking member 318 can include any bolt, rod, plate, piston, or any other device configured to engage the locking member receiver 320 to prohibit rotation of the front axle 300, rear axle 302, front axle drum 304, and/or the rear axle drum 306 in any direction.

To move the locking member 318 into the locked position, the actuator 322 moves the locking member 318 towards the locking member receiver 320 until the locking member 318 engages the locking member receiver 320. In the locked position, contact between the locking member 318 and the locking member receiver 320 prohibits the locking member receiver 320 and the rear axle drum 306 from rotating in any direction. Stopping rotation of the rear axle drum 306 results in stopping rotation of the tread 102. In the unlocked position, the locking member 318 does not contact the locking member receiver 320 and the locking member receiver 320 and the rear axle drum 306 is allowed to rotate freely. Multiple locks 316 may be used to stop rotation of the front axle 300, the rear axle 302, the front axle drum 304, or the rear axle drum 306. The lock 316 may be used in embodiments where the treadmill 100 is motorized or non-motorized.

Figure 4:
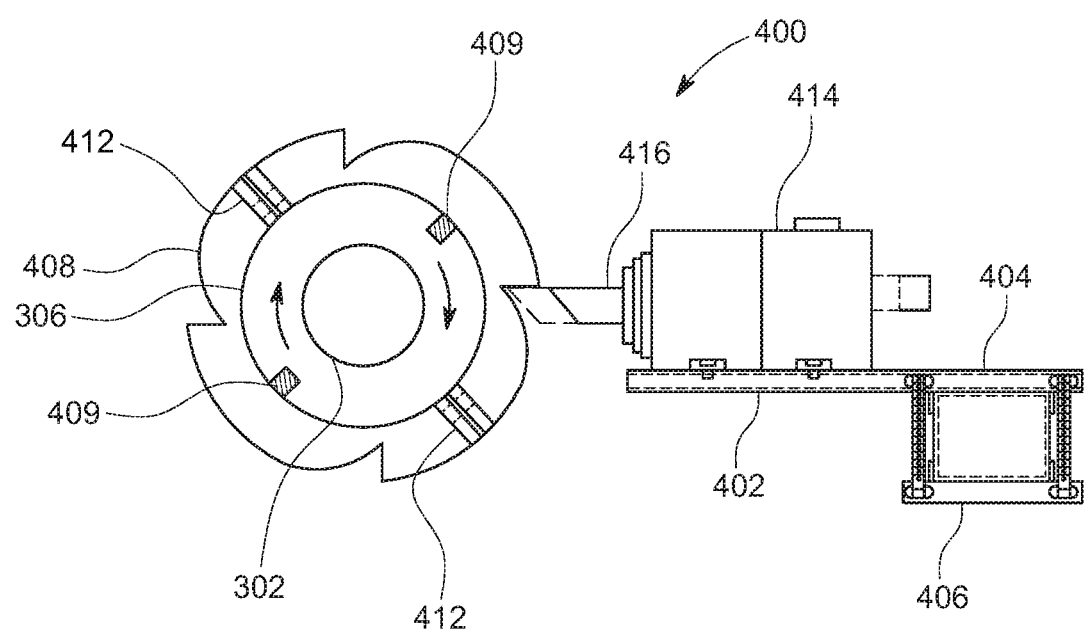
FIG. 4 is a side view of an embodiment of a lock.

FIG. 4 is a side view of an embodiment of a lock 400 that can be used as lock 316 and may include features similar to those of the lock 316 except as otherwise described. An actuator bracket 402 includes a first plate 404 and a second plate 406. The first plate 404 can be disposed on one side of any portion of the frame 202 and the second plate 406 can be disposed on an opposing side of the portion of the frame 202. The first plate 404 and the second plate 406 are coupled using nuts and screws, but any other described means of attachment can be used. The actuator bracket 402 is not limited to the structure shown in FIG. 4 but may include any intermediate component of any shape and size coupling an actuator to the frame 202.

The lock 400 includes a toothed cam 408 coupled to the rear axle drum 306 such that the toothed cam 408 rotates with the rear axle drum 306. The toothed cam 408 is coupled to the rear axle drum 306 using keys 409. The toothed cam 408 may include two halves that are coupled via flanges 412 and fasteners such as nuts and bolts. The toothed cam 408 may include sidewalls on opposing sides of the toothed cam 408. The toothed cam 408 is shown having four teeth but may include any number of teeth. The teeth of the toothed cam 408 may have any shape. In other embodiments, any type of cam having any shape may be used. The lock 400 includes a solenoid 414 (e.g., a bi-state solenoid) coupled to the first plate 404 of the actuator bracket 402 using screws, bolts, or any other described means of attachment. The solenoid 414 may include features similar to those of the actuator 322 except as otherwise described. In other embodiments, any other actuator may be used. The lock 400 includes a bolt 416 coupled to the solenoid 414. The bolt 416 may include features similar to those of the locking member 318 except as otherwise described.

The solenoid 414 is configured to move the bolt 416 between locked and unlocked positions. To move the bolt 416 into the locked position (shown in broken lines), the solenoid 414 moves the bolt 416 towards the toothed cam 408 until the bolt 416 engages a tooth of the toothed cam 408. Engagement between the bolt 416 and the tooth of the toothed cam 408 stops the toothed cam 408 from rotating in any direction. Stopping rotation of the toothed cam 408 stops rotation of the rear axle drum 306, which stops rotation of the tread 102. To move the bolt 416 into the unlocked position, the solenoid 414 is configured to move the bolt away from the toothed cam 408 until the bolt 416 does not contact the toothed cam 408, allowing the toothed cam 408 to rotate freely. In embodiments where the solenoid 414 is a bi-state solenoid, once the solenoid 414 is energized by the battery 310 to move the bolt 416 to the locked position, the bolt 416 remains in the locked position until the solenoid 414 is energized again. In such embodiments, the bolt 416 may remain in the locked position even if no power is supplied to the solenoid 414 or any other component of the treadmill 100. Similarly, once the solenoid 414 is energized by the battery 310 to move the bolt 416 to the unlocked position, the bolt 416 remains in the unlocked position until the solenoid 414 is energized again.

The lock 316 (or lock 400) may be in electrical communication with the controller 314 and may operate in conjunction with the weight sensors 118 and the presence sensors 116 as a user-initiated system and method as follows. When not in use, the treadmill 100 will be locked, i.e., the lock 316 will be in the locked position. For example, if, during operation of the treadmill 100, the controller 314 determines that the user is not present on the tread 102 and not present on the side rails 106, the controller 314 is configured to engage the lock 316 as previously described to prevent movement of the tread 102 in any direction. Engagement of the lock 316 may be instant, i.e., as soon as the sensors 118, 116 both fail to detect a user. Engagement of the lock 316 may occur after a period of time. In embodiments where the treadmill 100 is motorized, the controller 314 may disconnect (e.g., electrically disconnect) power to the electric motor (not shown) before engaging the lock 316. In embodiments where the treadmill 100 is non-motorized, the battery powers the actuator to engage the lock 316. Prior to or in response to engaging the lock 316, the display 112 may generate a notification indicating to the user that the lock 316 will be engaged and/or is engaged.

Once the controller 314 has engaged the lock 316, the lock 316 remains engaged until the controller 314 determines that one or more initiation criteria have been met. The initiation criteria may include one or more in combination: detection of the user's presence on the foot pads 122 by the weight sensors 118; detection of the user's presence on both side rails 106 by the weight sensors 118; detection of the user's presence on any portion of the side rail 106 by the weight sensors 118; detection of the user by the presence sensors 116; a determination by the controller 314 that a user weight detected by the weight sensors 118 meets or exceeds a threshold weight; and/or authorization of an identification code entered by the user (e.g., using the display 112).

In embodiments where the initiation criteria includes authorization of the identification code, the controller 314 may verify the identification code by comparing the identification code to a list of authorized codes stored locally on the treadmill 100 (e.g., in memory included in the controller 314) or remotely on a server device in communication with the treadmill 100 (e.g., in communication with the controller 314) in response to receiving the user's identification code. The controller 314 may disengage the lock 316 in response to determining that the identification code entered by the user matches one of the authorized codes. The identification code prevents unauthorized users from using the treadmill 100. In some embodiments, no identification code is required. Additionally and/or alternatively, the treadmill 100 may verify the identity of the user using biometric information detected by any sensors located on the treadmill 100 (e.g., fingerprint data, voice data, or facial recognition data).

Figure 5A:
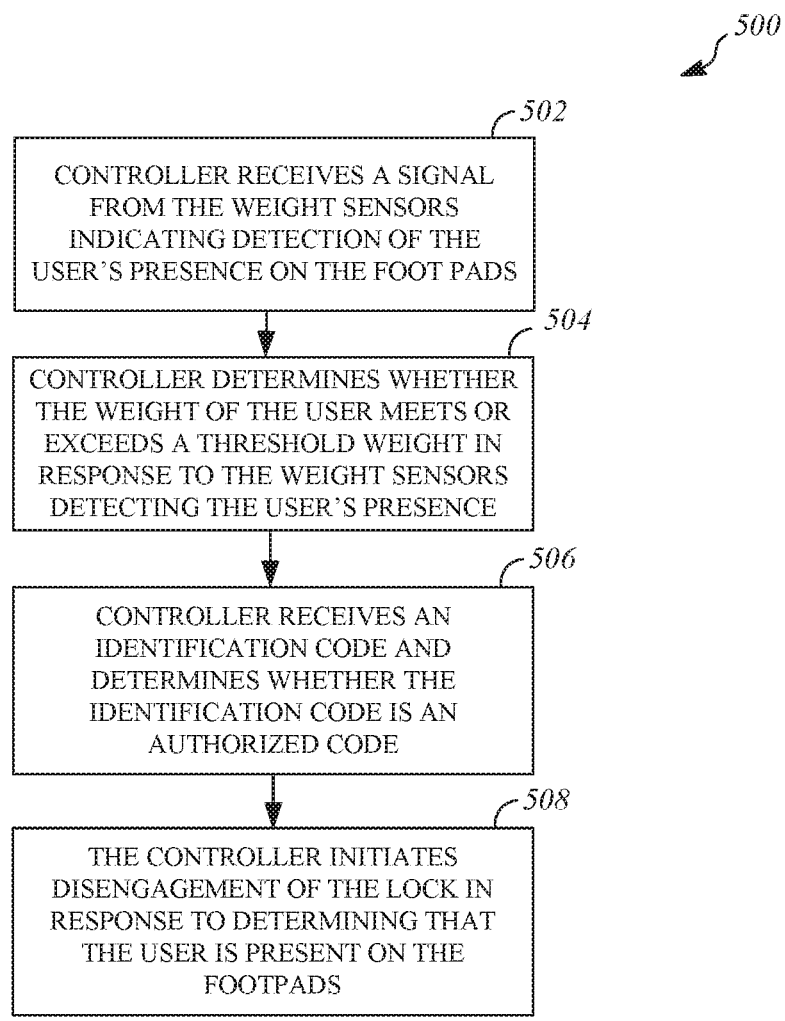
FIG. 5A is a flow diagram of an embodiment of a user-initiation system and process.

FIG. 5A is a flow diagram of an embodiment of the user-initiation system and process 500, initiating use of the treadmill 100 where the lock 316 is in the engaged position. It is contemplated that either or both of a weight sensor or presence sensor may detect a user on the treadmill and turn on the display. The display may direct the user to stand on the foot pads 122 to unlock the tread. In operation 502, the controller 314 receives a signal from the weight sensors 118 indicating detection of the user's presence the foot pads 122. In operation 504, the controller 314 determines whether the weight of the user meets or exceeds a threshold weight in response to the weight sensors 118 detecting the user's presence. The threshold weight can be preprogrammed into the controller or can be set by the owner or operator. As one example, the weight threshold reduces the chance that a child who should not be using the treadmill is able to unlock the treadmill. In optional operation 506, the controller 314 receives an identification code and determines whether the identification code is an authorized code. It is contemplated that the display may present a prompt for the user to input his or her identification code prior to or once the user is standing on the foot pads 122.

In operation 508, the controller 314 initiates disengagement of the lock 316 in response to determining that the user is present on the foot pads 122 and equals or exceeds the threshold weight and optionally inputted the proper identification code, leaving the user free to use the treadmill 100. The disengagement is powered by the battery for a non-motorized treadmill and is powered by the motor for a motorized treadmill. For example, referring to the lock 400 shown in FIG. 4, the controller 314 may initiate the solenoid 414 to move the bolt 416 away from the toothed cam 408 into the locked position. In operation 508, the controller 314 may also initiate activation of any other electronic components of the treadmill 100, including but not limited to any displays, lights, motors, or controllers. The initiation system will not be needed again until the lock is in its locked position.

Figure 5B:
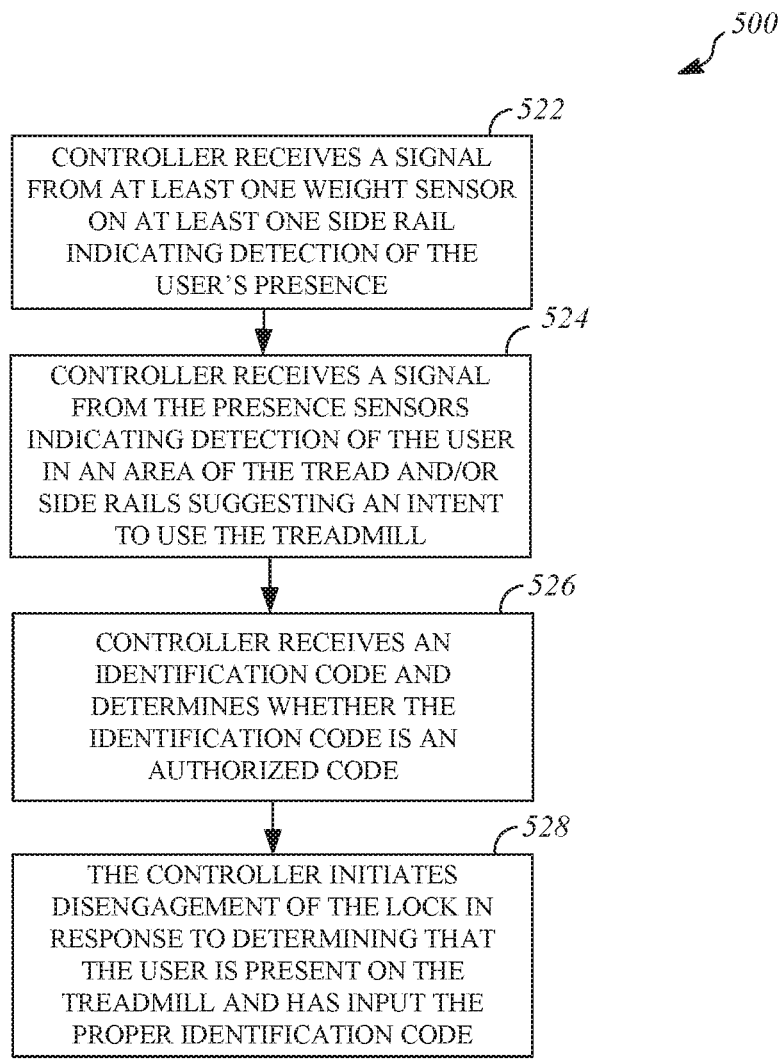
FIG. 5B is a flow diagram of another embodiment of the user-initiation system and process.

FIG. 5B is a flow diagram of another embodiment of the user-initiation system and process 520, initiating use of the treadmill 100 where the lock 316 is in the engaged position. It is contemplated that either or both of a weight sensor or presence sensor may detect a user on the treadmill and turn on the display. The display may direct the user to stand on the side rails for safety. In operation 522, the controller 314 receives a signal from at least one weight sensor 118 on at least one side rail indicating detection of the user's presence. Alternatively, the system may require that the controller 314 receives a signal from at least one weight sensor 118 on each side rail indicating presence of the user, i.e., the user is straddling the tread. In operation 524, the controller 314 receives a signal from the presence sensors 116 indicating detection of the user in an area of the tread and/or side rails suggesting an intent to use the treadmill. In operation 526, the controller 314 receives an identification code and determines whether the identification code is an authorized code. It is contemplated that the display may present a prompt for the user to input his or her identification code prior to or once the user is standing on the foot pads 122.

In operation 528, the controller 314 initiates disengagement of the lock 316 in response to determining that the user is present on the treadmill and has input the proper identification code, leaving the user free to use the treadmill 100.

Figure 6:
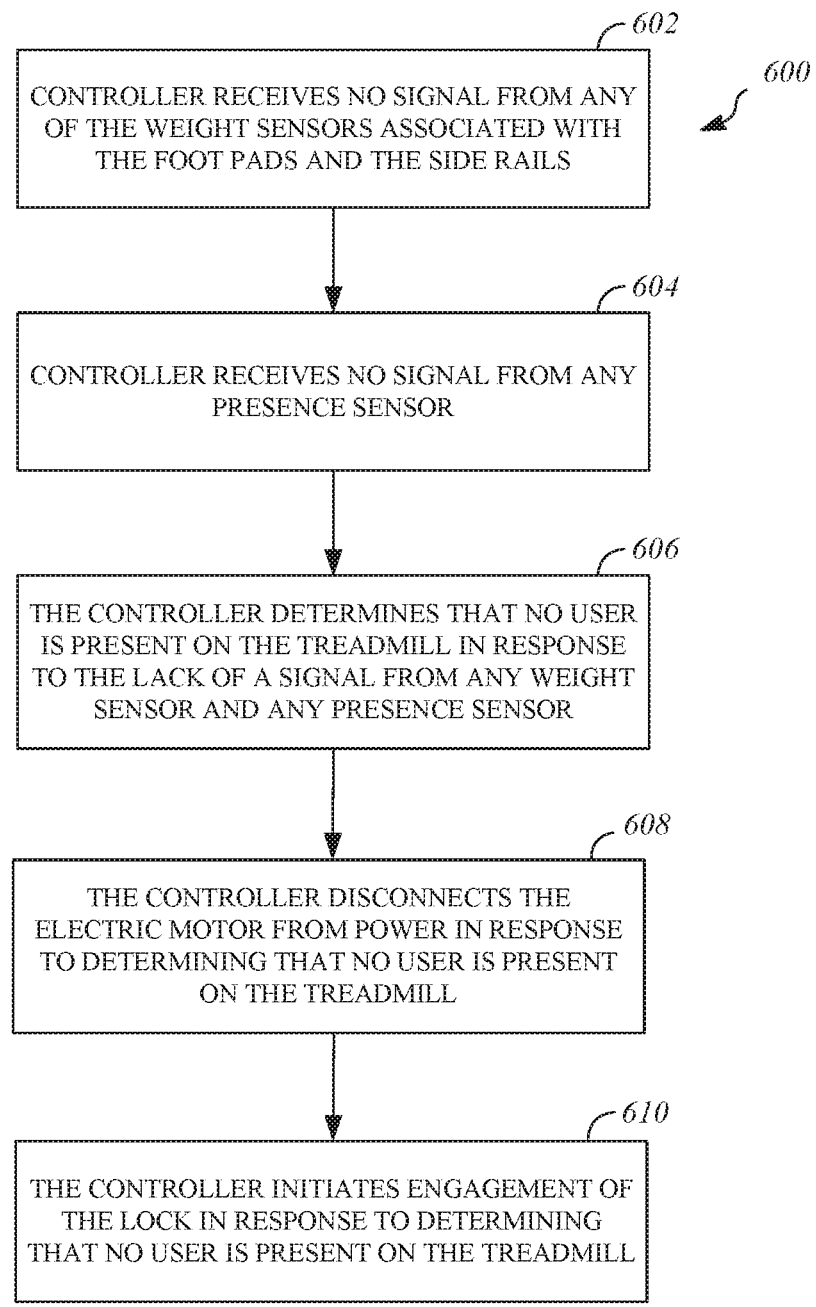
FIG. 6 is a flow diagram of a process of engaging a lock when the lock has been disengaged and the treadmill has been in use.

FIG. 6 is a flow diagram of a process 600 of engaging the lock 316 when the lock has been disengaged and the treadmill has been in use. In operation 602, the controller 314 receives no signal from any of the weight sensors 118 associated with the foot pads 122 and the side rails 106. In operation 604, the controller 314 receives no signal from any presence sensor 116. In operation 606, the controller 314 determines that no user is present on the treadmill 100 in response to the lack of a signal from any weight sensor 118 and any presence sensor 116.

In embodiments where the treadmill 100 is a motorized treadmill, the process 600 may include operation 608. In operation 608, the controller 314 disconnects the electric motor from power in response to determining that no user is present on the treadmill 100. The controller 314 may initiate engagement of the lock 316 in response to determining that no user is present on the treadmill 100 and in response to disconnecting the power to the electric motor. In embodiments where the treadmill 100 is a non-motorized treadmill, the process 600 proceeds from operation 606 to operation 610. In operation 610, the controller 314 initiates engagement of the lock 316 in response to determining that no user is present on the treadmill 100. The controller 314 may initiate engagement of the lock 316 after a threshold period has expired. In one example, the controller 314 may initiate engagement of the lock 316 in response to determining that no user is present on the treadmill 100 and to determining that the threshold period has expired. The threshold period begins in response to determining that no user is present on the treadmill 100. The threshold period of time can vary and can be set by the user of the treadmill or can be predetermined. The lock 316 remains engaged until the initiation process previously described is completed. The controller 314 may deactivate the display 112 and/or other electronic components of the treadmill 100 in response to determining that no user is present on the tread 102 and that no user is present on the side rails 106.

Referring back to FIG. 3, the treadmill 100 may include a brake 326. The brake 326 is configured to slow rotation of the tread 102 in response to the user stepping off of the tread 102 and onto the side rails 106 (e.g., while the user is resting). By slowing but not completely stopping rotation of the tread 102 while the user is resting on the side rails 106, the user may step back onto the tread 102 and continue using the treadmill more easily. Additionally and/or alternatively, the brake 326 may stop rotation of the tread 102 over a period of time if the user is standing on the side rails 106 for an extended period of time.

During use of the treadmill 100, a user may step on the side rails 106 and off of the tread 102 to take a drink, answer a phone call, talk to someone present, or rest, as non-limiting examples. When the user steps on the side rails 106 while the tread 102 is moving, the brake 326 engages to slow the tread 102 down so that when the user is ready to step back on the tread 102, the tread 102 moves at a slower, more manageable pace than when the user stepped off. If the treadmill 100 is a motorized treadmill, the power to the electric motor will be temporarily disconnected while the brake 326 is applied. The brake 326 may be applied until the user steps back on the tread 102, i.e., no weight sensor 118 on the side rails 106 detects the user's weight. The user will then bring the tread 102 up to the desired rotational speed, either under the user's own power (if the treadmill 100 is non-motorized) or by using a tread speed control on the display 112 (if the treadmill 100 is motorized). If the user remains off the tread 102 and on the foot pads 122 for a period of time, the brake 326 may be disengaged when a threshold time or speed is reached, allowing the tread 102 to further slow under its own momentum. Alternatively, the brake 326 can be applied until the earlier of the tread 102 is stopped or the user steps back on the tread 102.

The brake 326 may include a brake actuator 328, a brake actuator bracket 330, a braking member 332, and a braking member receiver 334. In the illustrated, non-limiting example, the braking member receiver 334 is coupled to and rotates with the front axle drum 304. The braking member receiver 334 includes a channel 336 having an interior profile corresponding to the exterior profile of the braking member 332. The braking member receiver 334 may be coupled to the front axle drum 304 using keys, screws, nuts, bolts, rivets, welding, or any other means of attachment. In other embodiments, the braking member receiver 334 may be coupled to the front axle 300, the rear axle 302, or the rear axle drum 306. The braking member receiver 334 is configured to receive the braking member 332. The braking member receiver 334 may include a circular coupling or any other device configured to receive the braking member 332 to slow rotation of the front axle 300, rear axle 302, front axle drum 304, and/or the rear axle drum 306. Multiple brakes 326 may be used to slow rotation of the front axle 300, the rear axle 302, or the rear axle drum 306. The brake 326 may be used in embodiments where the treadmill 100 is motorized or non-motorized.

The brake actuator 328 is configured to move the braking member 332 between a braking position and a non-braking position. The brake actuator 328 may include any type of spring, motor, solenoid, electric cylinder having an integrated motor, or any other device capable of moving the braking member 332 to engage the braking member receiver 334. The brake actuator 328 is coupled to the brake actuator bracket 330 using any described means of attachment. The brake actuator bracket is coupled to the frame 202 using any described means of attachment. In other embodiments, the brake actuator 328 may be directly coupled to any portion of the frame 202.

The brake actuator 328 is configured to move the braking member 332 to engage the braking member receiver 334. The braking member 332 can include a brake pad, caliper, or any other device configured to engage the braking member receiver 334 to slow rotation of the front axle 300, rear axle 302, front axle drum 304, and/or the rear axle drum 306.

To move the braking member 332 into the braking position, the brake actuator 328 moves the braking member 332 towards the braking member receiver 334 until the braking member 332 engages the braking member receiver 334. In the braking position, friction between the braking member 332 and the braking member receiver 334 reduces the rotational speed of the front axle drum 304. In the non-braking position, the braking member 332 does not engage the braking member receiver 334 and the front axle drum 304 is allowed to rotate freely. A reduction in rotational speed of the front axle drum 304 results in a reduction in rotational speed of the tread 102. In some embodiments, the braking member receiver 334 is not required and the braking member 332 directly engages the front axle 300, the rear axle 302, the front axle drum 304, and/or the rear axle drum 306.

Figure 7:
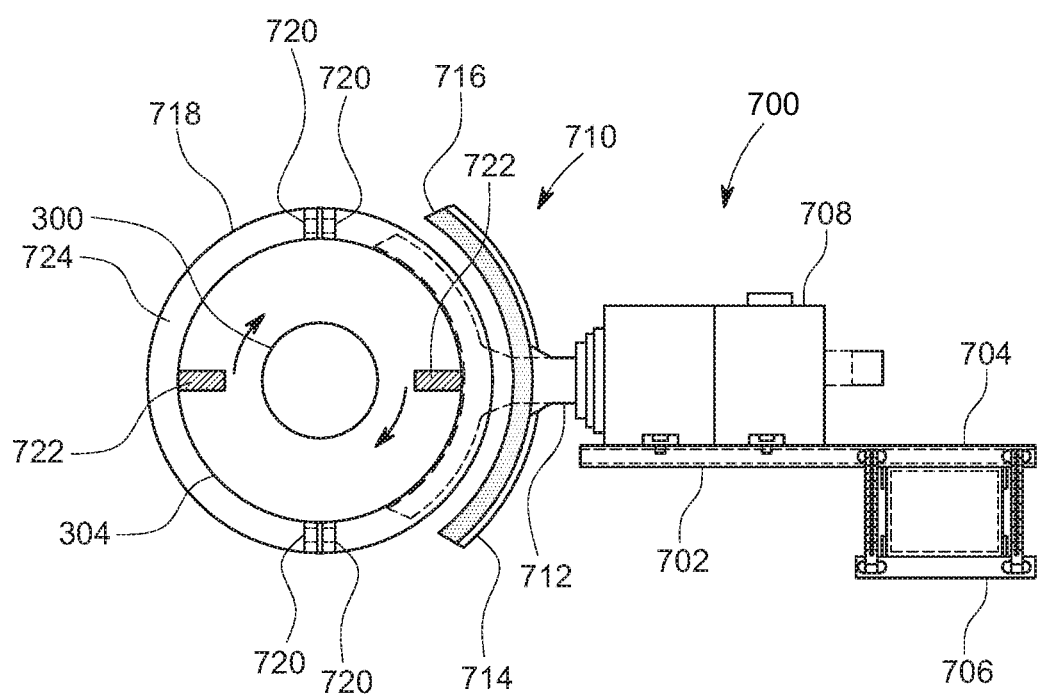
FIG. 7 is a side view of an embodiment of a brake.

FIG. 7 is a side view of an embodiment of a brake 700 that can be used as brake 326 and may include features similar to those of brake 326 except as otherwise described. In the illustrated, non-limiting example, the brake 700 includes a brake actuator bracket 702 including a first plate 704 and a second plate 706. The first plate 704 can be disposed on one side of any portion of the frame 202 and the second plate 706 can be disposed on an opposing side of the portion of the frame 202. The first plate 704 and the second plate 706 are coupled using nuts and screws, but any other described means of attachment can be used. The brake actuator bracket 702 is not limited to the structure shown in FIG. 7 but may include any intermediate component of any shape and size coupling a brake actuator to the frame 202.

The brake 700 includes a solenoid 708 (e.g., a bi-state solenoid) coupled to the first plate 704 of the brake actuator bracket 702 using screws, bolts, or any other described means of attachment. The solenoid 708 is an example of the brake actuator 328 except as otherwise described. The brake 700 includes braking member 710 having a bolt 712, a brake pad retainer 714, and a brake pad 716. The braking member 710 may include features similar to those of the braking member 332 except as otherwise described. The bolt 712 is coupled to a brake pad retainer 714. The brake pad retainer 714 may be integral with the bolt 712 or coupled separately to the bolt 712. The brake pad retainer 714 includes a curved shape. A brake pad 716 having a curved shape is coupled to the brake pad retainer 714. The brake pad 716 may be made of ceramic or any other suitable material. In other embodiments, the brake 700 may not include the braking member 710 but may include any device configured to engage a braking member receiver.

The brake 700 includes a circular coupling 718 extending around the front axle drum 304. The circular coupling 718 may include features similar to those of the braking member receiver 334 unless otherwise described. The circular coupling 718 may include two halves that are coupled via flanges 720 and fasteners such as nuts and bolts. The circular coupling 718 is coupled to the front axle drum 304 using keys 722. The circular coupling 718 defines a channel 724 having an interior profile shaped to correspond to an exterior profile of the brake pad 716. In other embodiments, the brake 700 may not include the circular coupling 718 but may include any device configured to receive a braking member (e.g., the bolt 712) to slow an axle or axle drum of the treadmill 100.

The solenoid 708 is powered by the battery 310 for a non-motorized treadmill and moves the braking member 710 between the braking and non-braking positions. In the braking position, the brake pad 716 contacts an interior surface of the channel 724 and friction between the brake pad 716 and the circular coupling 718 slows rotation of the front axle drum 304. In the non-braking position of the braking member 710, the brake pad 716 does not contact the circular coupling 718 and the front axle drum 304 is allowed to rotate freely. In embodiments where the solenoid 708 is a bi-state solenoid, once the solenoid 708 is energized by the battery 310 to move the braking member 710 to the braking position, the braking member 710 remains in the braking position until the solenoid 708 is energized again. Similarly, once the solenoid 708 is energized by the battery 310 to move the braking member 710 to the non-braking position, the braking member 710 remains in the braking position until the solenoid 708 is energized again.

The brake actuator 328 may be in electrical communication with the controller 314 and may operate in conjunction with the weight sensors 118 and the presence sensors 116 as follows. The presence sensors 116 located on the support members 108 and/or the handrail 110 are configured to detect the presence of the user on the treadmill 100 (e.g., the user is standing on any portion of the tread 102 or side rails 106). The weight sensors 118 located underneath the side rails 106 are configured to detect whether the user is present on any portion of the side rails 106 and/or foot pads 122. In response to the controller 314 determining that the user is present on the tread 102 and that the user is not present on either of the side rails 106, the brake 326 remains disengaged, allowing the tread 102 to rotate freely.

If, during operation of the treadmill 100, the controller 314 determines that the user is present on both the side rails 106 (e.g., simultaneously) and that the user is not present on the tread 102 (e.g., the user has stepped off the tread 102 onto one or both of the side rails 106) the controller 314 may engage the brake 326 to slow rotation of the tread 102 as previously described. Optionally, the controller 314 may be configured to apply the brake 326 only when the user is standing on both foot pads 122, indicating a desire for the brake to be applied. The display may indicate to the user during use that stepping on the foot pads 122 will apply the break during a rest period. In response to engaging the brake 326, the display 112 may generate a notification indicating to the user that the brake 326 is engaged. The brake 326 may slow rotation of the tread 102 to threshold speed which may be predetermined or may be set by the user. In response to the controller 314 determining that the tread 102 is rotating at the threshold speed, the controller 314 may fully or partially disengage the brake. After the brake 326 has been engaged, and in response to the controller 314 determining that the user is present on the tread 102 and not present on the side rails 106 (e.g., the user has stepped off of the side rails 106 back onto the tread 102), the controller may disengage the brake 326, allowing the tread 102 to rotate freely. In embodiments where the treadmill 100 is motorized, the controller 314 may disconnect (e.g., electrically disconnect) power to the electric motor before engaging the brake 326 and reconnect power when the brake 326 is disengaged.

Figure 8:
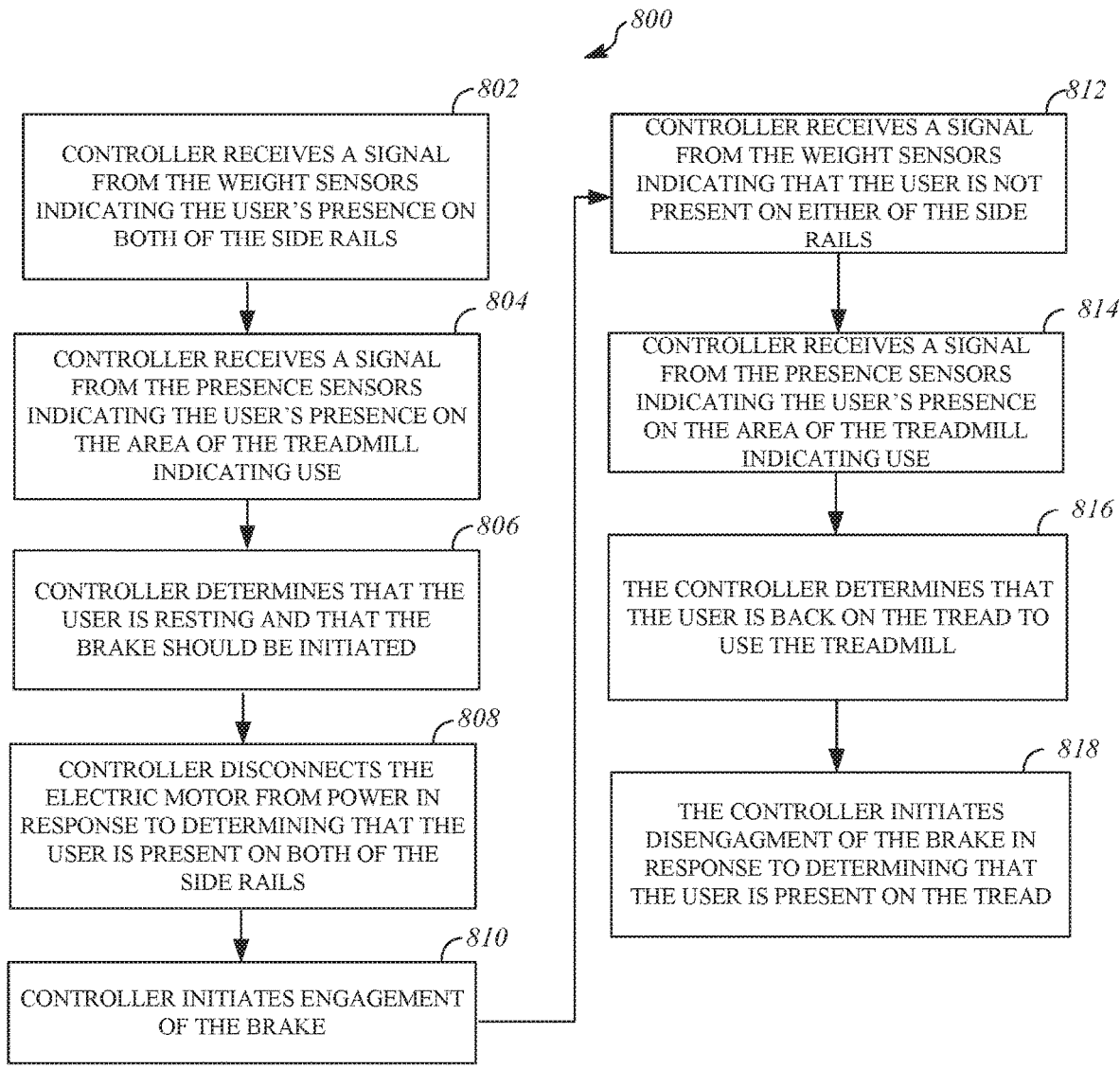
FIG. 8 is a flow diagram of a process of operating a brake while a tread of the treadmill is moving.

FIG. 8 is a flow diagram of a process 800 of operating the brake 326 while the tread 102 is moving. At operation 802, the controller 314 receives a signal from the weight sensors 118 indicating the user's presence on both of the side rails 106, e.g., the user is straddling the tread 102. At operation 804, the controller 314 receives a signal from the presence sensors 116 indicating the user's presence in the area of the treadmill 100 indicating use. At operation 806, the controller 314 determines that the user is "resting" and that the brake 326 should be initiated. In embodiments where the treadmill 100 is a motorized treadmill, the process 800 may include operation 808. In operation 808, the controller 314 disconnects the electric motor from power in response to determining that the user is present on both of the side rails 106. In embodiments where the treadmill 100 is a non-motorized treadmill, the process 800 proceeds from operation 806 to operation 810.

At operation 810, the controller 314 initiates engagement of the brake 326. For example, referring to the brake 700 shown in FIG. 7, the controller 314 can initiate the braking member 710 to move such that the brake pad 716 contacts the circular coupling 718. In some embodiments, the controller 314 may initiate engagement of the brake 326 in response to determining the user is present on any portion of each side rail. In other embodiments, the controller 314 may initiate engagement of the brake 326 in response to the user being present on the foot pads 122. Additionally and/or alternatively, the controller 314 may initiate engagement of the brake 326 in response to the tread 102 reaching a maximum speed. The maximum speed may be set by the user or may be predetermined.

At operation 812, the controller 314 receives a signal from the weight sensors 118 indicating that the user is not present on either of the side rails 106 (e.g., the controller detects that no signal is received from any weight sensor 118 on either side rail 106). At operation 814, the controller receives a signal (i.e., continues to receive the signal of presence of the user) from the presence sensors indicating the user's presence on the area of the treadmill 100 indicating use. At operation 816, the controller determines the user is back on the tread 102 to use the treadmill 100. At operation 818, the controller 314 initiates disengagement of the brake 326 in response to determining that the user is present on the tread 102. For example, referring to the brake 700 shown in FIG. 7, the controller 314 can initiate the braking member 710 to move such that the brake pad 716 does not contact the circular coupling 718.

The treadmill 100 may include lights and lighting systems configured to provide information to the user and/or to others (e.g., warn others in the vicinity that the treadmill 100 is operational).

Referring back to FIG. 1, one or more of the proximity sensors 120 may be located on one or more of the side skirts 104. For example, one or more proximity sensors 120 can be located on a side surface of the side skirts 104 such that the proximity sensors 120 are spaced around a periphery of the treadmill 100. Additionally and/or alternatively, the proximity sensors can be located on any other portion of the treadmill 100, including but not limited to the support members 108 or the handrail 110. The proximity sensors 120 may include one or more infrared sensors, ultrasonic sensors, LED linear light sensors, or any other sensor configured to detect a presence of a person, animal, or object approaching the treadmill 100. For example, the proximity sensors 120 may be configured to detect the presence of any person within a predetermined radius of the proximity sensor 120 (e.g., 20-48 inches). The controller 314 may receive signals from the proximity sensors 120 indicating detection of the user or another person approaching the treadmill 100.

When the controller 314 receives signals from at least one of the proximity sensors 120 and the treadmill is not in use, the controller may initiate the display upon receipt of the signal, and the display may provide the user-initiation steps for using the treadmill, as a non-limiting example. When the controller 314 receives signals from at least one of the proximity sensors 120 and the treadmill 100 is in use, the display may warn the user that the treadmill is being approached.

The treadmill 100 may include peripheral lights 124 configured to illuminate an area on the floor surrounding the treadmill 100 to, for example, alert an approaching person that he or she is approaching a treadmill 100 that is in use, i.e., the tread 102 is moving. The peripheral lights 124 may be located on and/or under the side skirts 104, side rails 106 or handrails peripheral 110, and may include LED lights, lasers, projectors, or any other light source. The peripheral lights 124 may be of any color and may illuminate according to any predetermined or user-customized setting (e.g., flashing). The peripheral lights 124 may also change color according to any predetermined or user-customized setting. The lights 124 may project any symbols, words, patterns, or images onto the surrounding area in any configuration or orientation. As a non-limiting example, the peripheral lights 124 can form a light wall 126 on the floor around the treadmill 100 to warn approaching persons that the treadmill 100 is in use. The light wall may be spaced from the treadmill 100, such as 12-24 inches from the treadmill 100 and may surround the treadmill 100 partially or completely. The peripheral lights 124 can be yellow or red, for example, which are typically used to indicate a warning such as yield or stop.

The peripheral lights 124 may operate in conjunction with the controller 314 and other components of the treadmill 100 as follows. In response to the controller 314 determining that a subject is present within a predetermined radius of a treadmill 100 that is in use (e.g., in response to the proximity sensors 120 detecting the presence of an approaching person), the controller 314 may activate the peripheral lights 124 to illuminate the area surrounding the treadmill. In response to the proximity sensors 120 detecting the presence of a person approaching the treadmill 100 (e.g., from the side or from behind the treadmill 100), the display 112 may generate a notification for the user indicating to the user the approaching person's presence and location relative to the treadmill 100.

The controller 314 may activate the peripheral lights 124 to illuminate the area surrounding the treadmill and/or may change the color of the peripheral lights 124 in response to engagement of the brake 326 or in response to engagement of the lock 316. For example, the peripheral lights 124 may not be activated when the lock 316 is engaged.

One or more projectors 114 may be located on any portion of the treadmill 100, including but not limited to any portion of the handrail 110 (e.g., inside the handrail 110), the support members 108, and/or the side skirts 104. The projectors 114 may be configured to project an image onto a projection area 115. The projection area 115 may include any area nearby the treadmill (e.g., floors, walls, or ceiling). The image may include any previously described biometric and/or performance data associated with the user or another treadmill user. For example, the projectors 114 can project biometric or user performance data on the floor near the treadmill 100 to be viewed by judges during a competition. Additionally and/or alternatively, the projectors 114 can project advertising or marketing information such as a company logo. The projectors 114 may project the data onto any surface or surfaces near the treadmill 100 in response to a command issued by the user. The controller 314 may activate the projectors 114 in response to determining the user is present near the treadmill 100.

The treadmill 100 may include a lighting system configured to emit light through the tread. The lighting system may alert the user and other individuals that the treadmill 100 is operational, may warn individuals nearby the treadmill 100 not to approach to the treadmill 100, and may communicate biometric or performance information to the user or observers, such as judges in a competition.

As shown in FIG. 1, the tread 102 may be formed of multiple slats. The slats are configured to form a surface on which the user may exercise and are positioned next to adjacent slats to mimic a continuous belt, with a small space between adjacent slats or adjacent slats in contact with each other. The lighting system includes lights positioned below the slats on which the user stands. The lights are located in a cavity defined on the top and bottom by the tread 102 that rotates on the front and rear axles 300, 302. The tread surface is the surface facing away from the cavity and includes the surface on which the user exercises. The lock 316, the brake 326, the front axle 300, rear axle 302, the front axle drum 304, and the rear axle drum 306 may be located in the cavity.

The lights may be configured to emit light away from the cavity and through the one or more adjacent slats along any length of the tread 102. The lights may include LEDs, neon lights, or lights of any other type and may be included in a lighting strip, light pipe, light tube, light guide or light rope. A combination of lights may be used, such as LEDs in combination with a light pipe. The lights may also include one or more integrated circuits. Light pipes and light tubes are physical structures used for transmitting or distributing light, the structures often curved but can be linear. The terms as used herein includes the light, such as LED, that is used in combination with the structure. A light guide distributes light from the source to a particular area that requires illumination. The source, such as an LED, is included in the light guide as used herein. A light rope includes lights, such as LEDs, encased in a material such as PVC to create a string of lights. Other lights as known to those skilled in the art are contemplated herein. The light pipe, light guide, light rope, etc. structures may have a rectangular shape, a cylindrical shape, a tubular shape, or any other shape and may can be of varying dimensions. The lights may be a particular color, or may be able to change color based on timing or a control mechanism.

The lighting system may also include the controller 314 or any other controller configured to control the lights. The lights may be in communication (e.g., wired or wireless communication) with the controller 314 or any other controller. The lights may operate in conjunction with the controller 314 and other components of the treadmill 100. The controller 314 may control the activation, deactivation, color, brightness, and/or light emission frequency of the lights. The controller 314 may configured to control at least one of the color, brightness, or light emission frequency of the lights in response to receiving a signal from a biometric sensor shown in FIG. 1. The biometric sensor may include the non-contact skin temperature sensor 113, a heartrate sensor, one or more of the weight sensors 118, or any other sensor configured to detect biometric information associated with the user. The biometric sensor may be located on any portion of the treadmill 100. The controller 314 may also be configured to control at least one of the color, brightness, or light emission frequency of the lights in response to calculating biometric information of the user based on signals received from the biometric sensor, including but not limited to calories burned or body mass index. The biometric sensor may detect biometric information data associated with the user in response to a request from the user. Additionally and/or alternatively, the biometric sensor may detect biometric information associated with the user in response to the weight sensors 118 detecting the user's presence on the foot pads 122 and/or side rails 106.

The controller 314 may control at least one of the color, brightness, or light emission frequency of the lights based on performance data associated by the user, including but not limited to distance traveled, distance remaining, workout duration, workout time remaining, tread speed, user running pace, or any other user performance information; and/or data associated with another treadmill user.

The controller 314 may also activate the lights in response to receiving a signal from the proximity sensors 120 indicating the presence of a user or another individual near the treadmill 100. For example, when the treadmill is not in use, the proximity sensors 120 may detect that a person is approaching the treadmill 100 and send a signal to the controller 314 to activate the lights. The lights may be activated to invite the approaching person to use the treadmill 100, such as using certain colors or flashing lights. As another example, when the treadmill 100 is in use, the proximity sensors 120 may detect that a person is approaching the treadmill 100 and send a signal to the controller 314 to flash the already activated lights or to change the color of the lights to a color such as yellow or red to warn the approaching person that the tread 102 is moving.

The lights may include one or more sets of lights configured to illuminate different portions of the treadmill 100. For example, the lighting system may include a first set of lights configured to be controlled by the controller 314 to illuminate a front portion 128 (shown in FIG. 1) of the treadmill. The front portion of the treadmill 100 is associated with the location where slats approach the front axle 300 and turn around the front axle 300. The lighting system may include a second set of lights configured to be controlled by the controller 314 to illuminate a rear portion 130 (shown in FIG. 1) of the treadmill, where the rear portion 130 is opposite the front portion 128. The rear portion 130 is associated with the location where slats approach the rear axle 302 and turn around the rear axle 302. The lighting system may also include a third set of lights configured to illuminate a middle portion 130 (shown in FIG. 1) of the treadmill, where the middle portion 132 extends between the front portion 128 and the rear portion 130. The front portion, the rear portion, and the middle portion of the treadmill can be separately illuminated by the lights in any color, brightness, or light emission frequency in any combination. For example, the controller 314 may be configured to illuminate the front and rear portions of the treadmill 100 using a first color (e.g., yellow) and to illuminate the middle portion using a second color (e.g., green). By illuminating the front and rear portions of the treadmill 100 using a color typically associated with a warning, such as yellow, orange, or red, the lighting system may alert individuals nearby the treadmill 100 to use caution while near the treadmill 100.

Figure 9:
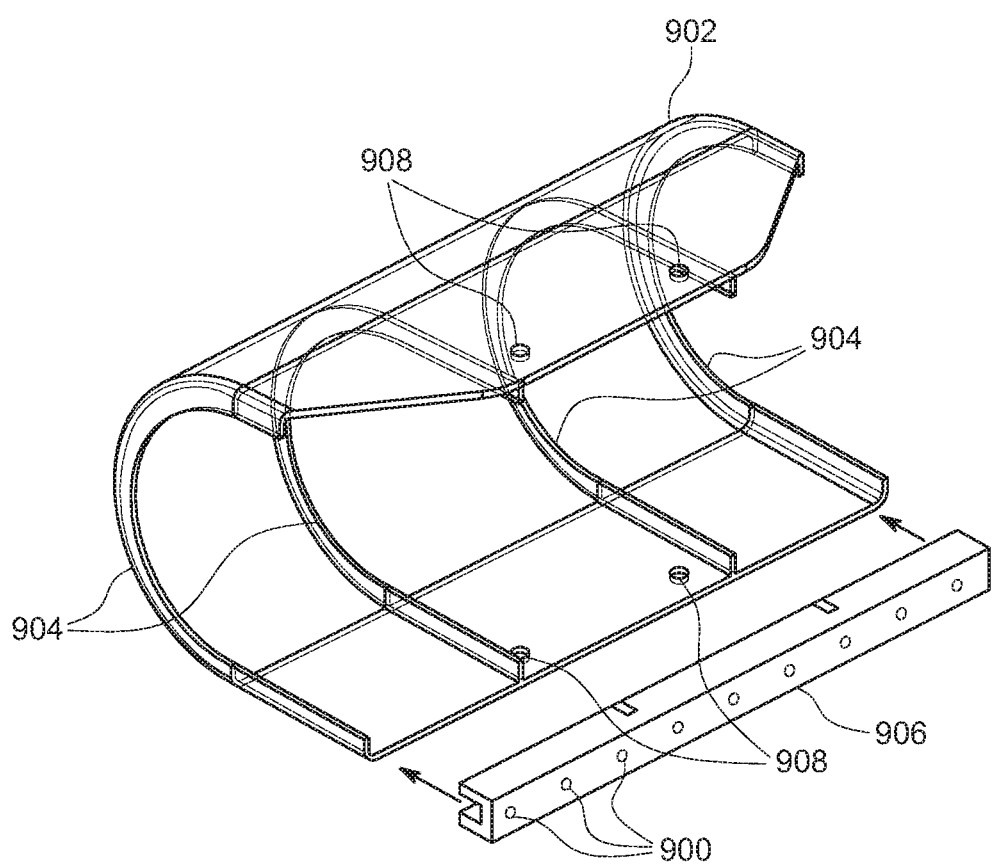
FIG. 9 is a top perspective view of lights configured to emit light through a first lens.

The lighting system may include lights located in the cavity that remain stationary with respect to the tread 102. FIG. 9 is a top perspective view of lights 900 configured to emit light through a first lens 902. The lights 900 may include features similar to those of the lights previously described. The first lens 902 may include a transparent or semi-transparent member configured to receive light from the lights 900 and to emit light through the tread 102 (not shown in FIG. 9). The first lens 902 may be made of any plastic such as acrylic, glass, or any other material configured to refract light emitted by the lights 900. The first lens 902 may have a curved shape and may extend around a portion of a circumference of the front axle 300, the rear axle 302, the front axle drum 304, or the rear axle drum 306. For example, the first lens 902 shown in FIG. 9 includes a plastic sheet having curved shape such that the first lens 902 may be attached to the treadmill 100 around a portion of a circumference of the front axle drum 304. The first lens 902 may be located upstream of the front axle 300 or the front axle drum 304 in relation to movement of the tread 102. In this position, the first lens 902 may illuminate the front portion of the treadmill when the lights 900 are activated. The first lens 902 may include ribs 904 extending along a length of the first lens 902 to structurally reinforce the first lens 902.

A second lens (not shown) having features similar to those of the first lens 902 may include a curved shape and may extend around a portion of a circumference of the rear axle 302 or the rear axle drum 306 such that the rear portion of the treadmill 100 may be illuminated. The second lens may be located in the cavity downstream of the rear axle 302 or the rear axle drum 306 in relation to the movement of the tread 102. A second set of lights (not shown) having features similar to those of the lights 900 may be attached to the second lens.

The lights 900 may be positioned and/or configured in the cavity such that the lights 900 emit light through the first lens 902 to illuminate a portion of the tread 102. For example, the lights may be positioned on an edge of the first lens 902 such that light emitted by the lights 900 is refracted by the first lens 902 and emitted through or between adjacent slats of the tread 102. In the illustrated, non-limiting example, the lights 900 are located on a housing 906. The housing 906 is attached to an edge of the first lens 902 such that the lights 900 emit light through the first lens 902. In other embodiments, the housing 906 may be attached to any portion of the first lens 902. The housing 906 may include a bracket configured to attach to the first lens 902, a transparent flexible tube in which the lights 900 are located, an elongate strip, or any other device configured to attach the lights 900 to the first lens 902. In other embodiments, the lights 900 may be directly attached to the first lens 902. In other embodiments, the lights 900 may not be connected to the first lens 902 and may be located near the first lens 902 such that the lights 900 emit light through the first lens 902. The first lens 902 may include apertures 908 to attach the first lens 902 to the frame 202, a lens bracket, or any intermediate component, or any other component of the treadmill 100.

Figure 10:
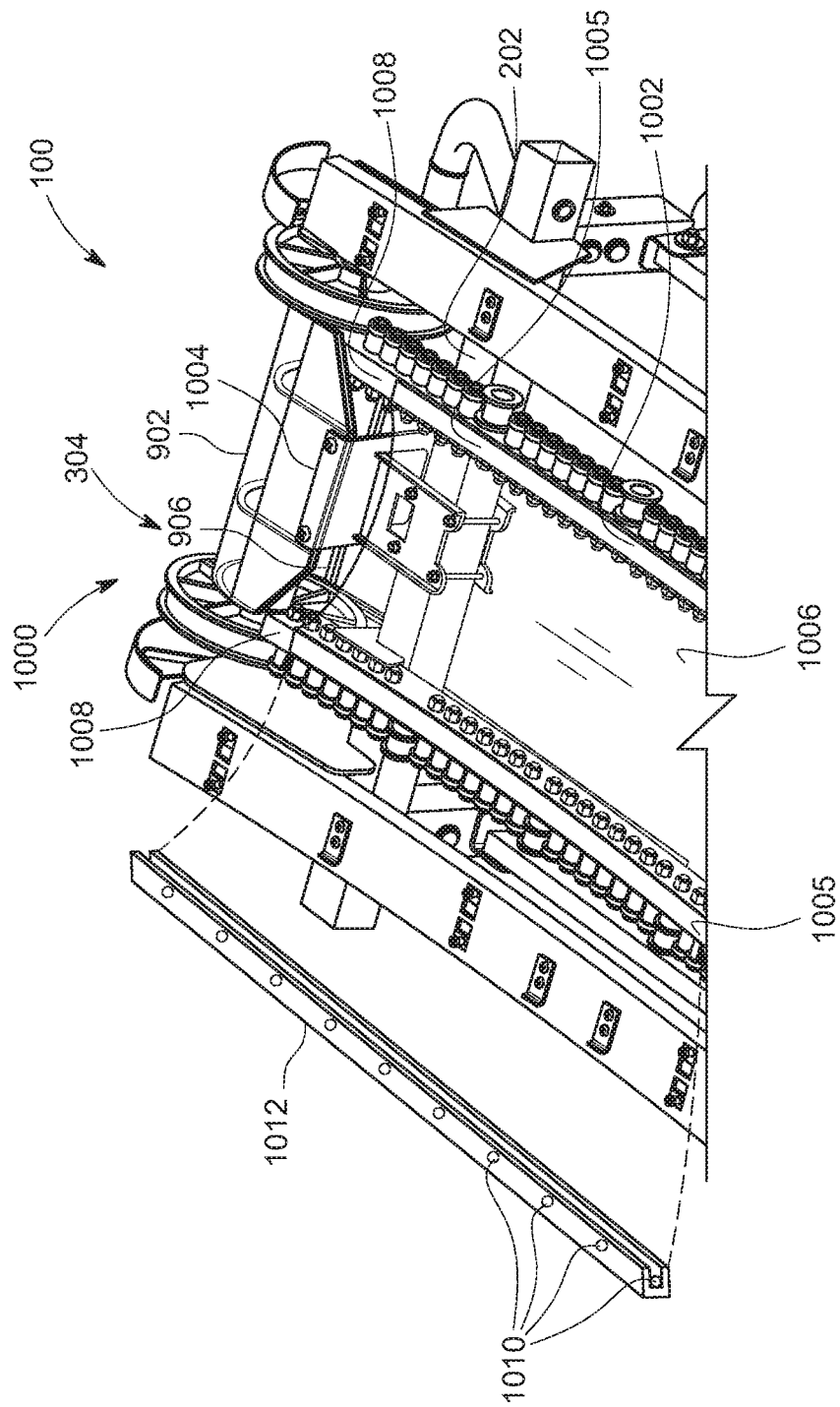
FIG. 10 is a top perspective view of the first lens and a third lens located in a cavity.

FIG. 10 is a top perspective view of the first lens 902 and a third lens 1002 located in a cavity 1000. The cavity 1000 may include features similar to those of the cavity previously described. In the illustrated, non-limiting example, the first lens 902 is attached to a lens bracket 1004 such that the first lens 902 extends around the front axle drum 304. The housing 906 is attached to a bottom edge of the first lens 902. The lens bracket 1004 is attached to a member of the frame 202. The lens bracket 1004 may be attached to the first lens 902 and the frame 202 using any means of attachment. In the position shown in FIG. 10, the first lens 902 may illuminate the front portion of the treadmill when the lights 900 emit light through the first lens 902. A second lens (not shown) having features similar to those of the firsts lens 902 may be similarly attached to the rear portion of the treadmill 100 such that the second lens may extend around the rear axle drum 306 and illuminate the rear portion of the treadmill 100.

The third lens 1002 may include features similar to those of the first lens 902 except as otherwise described. The third lens 1002 may extend along a length of the middle portion of the treadmill 100. In other embodiments, the third lens 1002 may extend along any length of the treadmill 100. The third lens 1002 may include flanges 1005 and an arcuate portion 1006 extending between the flanges 1005. The flanges 1005 may be integral with the arcuate portion 1006 or may be separately connected to the arcuate portion 1006. In other embodiments, the third lens may include any other shape or orientation. The flanges 1005 may be attached to top surfaces of bearing supports 1008. The bearing supports 1008 may support bearings used to rotate belts attached to the slats (not shown) forming the tread 102. In other embodiments, the third lens 1002 may be attached to any portion of the frame 202 or any other component of the treadmill 100. Lights 1010 having features similar to those of lights 900 may be configured to emit light into the third lens 1002 to illuminate the middle portion of the treadmill 100. For example, the lights 1010 may be positioned on an edge of the third lens 1002 such that light emitted by the lights 1010 is refracted by the third lens 1002 and emitted through or between adjacent slats of the tread 102. In the illustrated, non-limiting example, the lights 1010 are located on a housing 1012 having features similar to those of the housing 906. The housing 1012 is attached to an edge of the third lens 1002 such that the lights 1010 emit light through the third lens 1002. In other embodiments, the housing 1012 may be attached to any portion of the third lens 1002.

In other embodiments, the treadmill 100 may include one lens configured to extend along the length of the treadmill 100 and to extend around the front axle 300 and the rear axle 302. Lights and/or housings may be attached to the lens as described such that the lights illuminate the front portion, rear portion, and middle portion of the treadmill 100.

Figure 11:
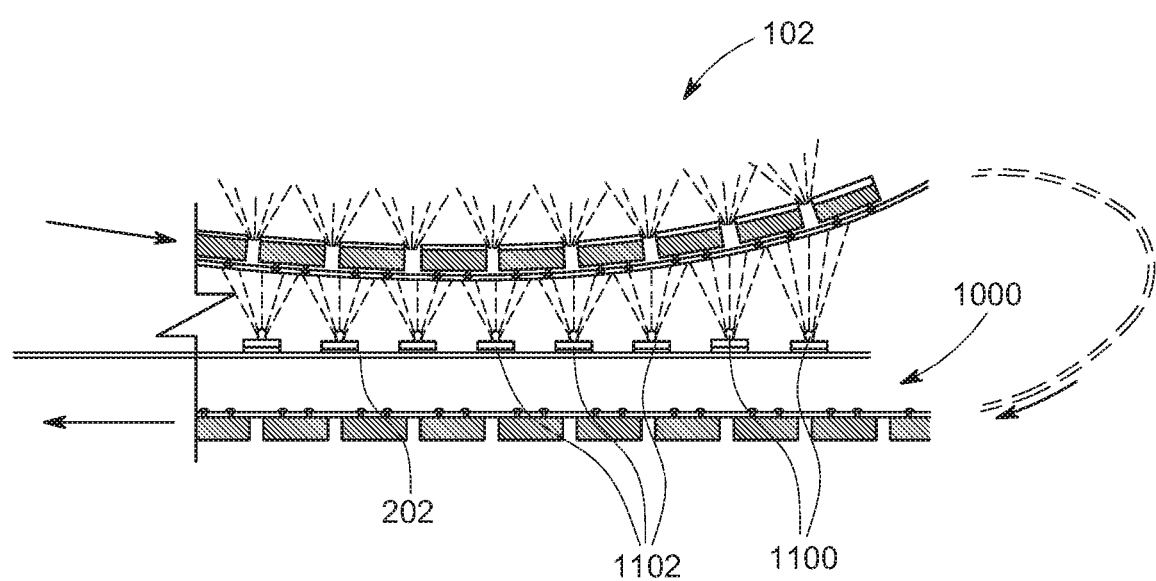
FIG. 11 is a side view of the tread and the cavity in which lights are located in the cavity and remain stationary relative to the tread.

FIG. 11 is a side view of the tread 102 and the cavity 1000 in which lights 1100 are located in the cavity and remain stationary relative to the tread 102. The lights 1100 may include features similar to those of any lights previously described. The lights 1100 may be attached to cross members 1102, which may or may not be members of the frame 202. The cross members 1102 may be attached at opposing longitudinal ends to the frame 202. In other embodiments, the lights 1100 may be attached to any member of the frame 202 or any other component located in the cavity 1000. The lights 1100 are configured to emit light away from the cross members 1102 and between the adjacent slats. In the illustrated, non-limiting example, the lights 1100 are connected to cross members 1102 within the cavity 1000 such that the lights 1100 illuminate the middle portion of the treadmill 100. In other embodiments, the lights 1100 may be connected to cross members 1102 such that the lights 1100 also illuminate the front and rear portions of the treadmill 100. The controller 314 may control the color, brightness, and light emission frequency of the lights 1100 based on the position of the lights 1100 relative to the treadmill. For example, the controller 314 may control lights 1100 located near the front and rear portions of the treadmill 100 to emit yellow light between adjacent slats. The controller 314 may also control lights 1100 located near the middle portion of the treadmill 100 to emit green light through the tread 102. The lights 1100 can be placed such that there is at least one light associated with each slat. Alternatively, the lights can be spaced at intervals in the cavity not associated with the size of the slats.

Figure 12:
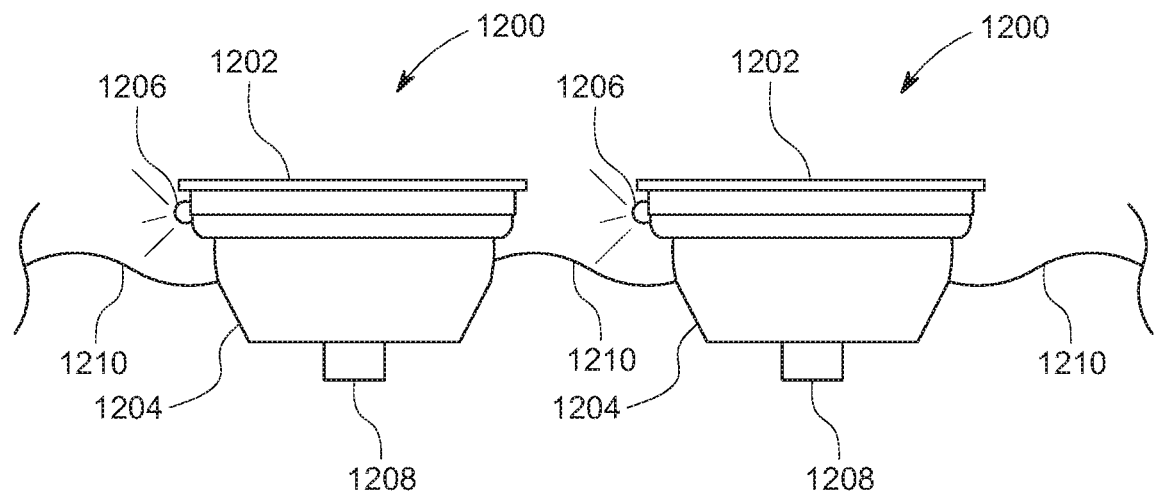
FIG. 12 is a side view of a slat of the tread.

The lighting system may include lights located on the slats forming the tread 102 such that the lights rotate with the tread 102 around the front axle 300 and the rear axle 302. FIG. 12 is a side view of a slat 1200. The slat 1200 may include a tread surface 1202 on which the user exercises. The slat 1200 may also include an underside 1204 which includes any surface of the slat 1200 that is not the tread surface 1202, including any side surfaces. One or more lights 1206 may be attached to the underside 1204 of the slat such that the lights 1206 emit light between adjacent slats 1200 forming the tread 102. The lights 1206 may include features similar to those of any lights previously described. In the illustrated, non-limiting example, a series of lights 1206 are attached to each of the front and back surfaces of the underside 1204 of the slat 1200. In other embodiments, a series of lights 1206 may be attached to only one of the front or back surface of the underside 1204. The lights 1206 may be attached to the underside 1204 of the slat 1200 using a housing as previously described. For example, a light rope, light pipe, light guide or light bar may be attached to a leading edge of the underside of each slat 1200.

The lights 1206 attached to each slat 1200 may be controlled by a controller. The controller may include the controller 314 or any other controller. The controller 314 may be configured to control the activation, deactivation, color, brightness, and/or light emission frequency of the lights 1206. Alternatively, each slat 1200 may include a light controller attached to the underside 1204 of the slat 1200. Each light controller may be configured to control the lights 1206 of each respective slat in the same manner as the controller 314. Each light controller may be in communication with the controller 314.

The controller 314 may be configured to control the activation, deactivation, color, brightness, and/or light emission frequency of the lights 1206 attached to the slat 1200 in response to determining the position of the slat 1200 relative to the treadmill. For example, the controller 314 may control the lights 1206 to emit light in a first color (e.g., yellow) in response to determining that the slat 1200 is located in the front portion or the rear portion of the treadmill 100. The controller 314 may also control the lights 1206 to emit light in a second color (e.g., green) in response to determining that the slat 1200 is located in the middle portion of the treadmill 100.

To power the lights attached to the slat 1200, the slat 1200 may include a contactor 1208 attached to the underside 1204 and in electrical communication with the lights 1206. The contactor 1208 may be attached to the underside 1204 within a recess defined by the underside 1204. The contactor 1208 may receive power from a power rail (further described with respect to FIG. 13) that extends along a length of the treadmill 100 and that is located in the cavity 1000. The power received by the contactor 1208 may be supplied to the lights 1206. The contactor 1208 receives power from the power rail, which remains stationary with respect to the tread 102, in response to contacting the power rail while the slat 1200 rotates around the front and rear axles. The contactor 1208 may include a motor brush (e.g., carbon brush) or any other component configured to receive power from the power rail and supply the power to the lights 1206. The slat 1200 may include multiple contactors 1208, including a contactor for conducting a positive charge and a contactor for conducting a negative charge. The slat 1200 may include contactors 1208 located at opposing longitudinal ends of the slat 1200.

Figure 13:
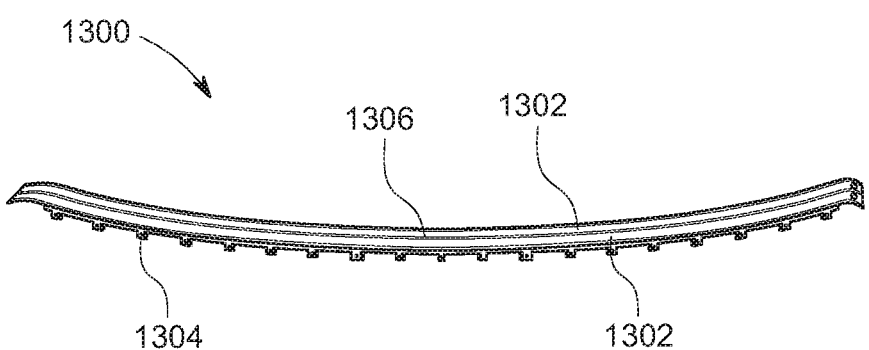
FIG. 13 is a top perspective view of a power rail.

FIG. 13 is a top perspective view of a power rail 1300. The power rail 1300 may include an elongate member configured to supply power to the contactor 1208 in response to contacting the contactor 1208 as the slats (e.g., the slat 1200) rotate around the front and rear axles. The power rail 1300 may receive power from the battery 310, the power cord, the electric motor, or any other power source. The power rail 1300 may be shaped to receive the contactor 1208 as the contactor 1208 and the slat 1200 rotate around the front and rear axles. For example, the power rail 1300 may include one or more channels configured to receive the contactor 1208.

The power rail 1300 may include one or more strips of conductive material 1302 (e.g., copper) attached to an insulator member 1304. The strip of conductive material 1302 supplies power to the contactor 1208 while the strip of conductive material 1302 and the contactor 1208 are in contact. The insulator member 1304 may be made of any insulating material (e.g., rubber or plastic) and may electrically insulate the strips of conductive material 1302 from other components of the treadmill 100. The insulator member 1304 may include a wall 1306 configured to electrically insulate the strips of conductive material 1302 from each other (e.g., to separate positive contact and negative ground). Each of the strips of conductive material 1302 may receive one contactor 1208. For example, one strip of conductive material 1302 may receive a first contactor and another strip of conductive material 1302 may receive a second contactor. The insulator member 1304 may be connected to the bearing supports 1008, to any portion of the frame 202, or to any other component of the treadmill 100 such that the contactor 1208 may contact the strips of conductive material 1302 while the slat 1200 rotates around the front and rear axles.

As the slats 1200 rotate around the front and rear axles, the contactors 1208 attached to the undersides 1204 of the slats 1200 contact the power rail 1300 and supply power to the lights 1206 attached to the respective slats 1200. While powered, the lights 1206 emit light between adjacent slats to illuminate portions of the treadmill 100. In some embodiments, every slat 1200 includes a contactor 1208. The contactor 1208 of each slat may be configured to supply power to the lights 1206 connected to the underside 1204 of each respective slat 1200 in response to contacting the power rail 1300. In such embodiments, when slats 1200 rotate such that the contactors 1208 no longer contact the power rail 1300, the lights 1206 attached to the slats 1200 are not powered and do not emit light. The power rail 1300 may therefore be located in positions within the cavity 1000 where illumination of the treadmill 100 is desired. For example, the power rail 1300 may be positioned near a top of the cavity 1000 such that the power rail 1300 powers lights 1206 attached to slats 1200 that are presently located in the middle portion of the treadmill 100 as the slats 1200 rotate around the front and rear axles. In another example, portions of the power rail 1300 may extend around the front and rear axles of the treadmill 100. In this configuration, the power rail 1300 may power lights 1206 attached to slats 1200 to illuminate the front, rear, and/or middle portions of the treadmill 100 as the slats 1200 rotate around the front and rear axles. The power rail 1300 may be continuous or may be placed in intervals along the path of the tread. The power rail 1300 may be along an entire path of the tread so that the lights on the slats are continuously lit. There may be a power rail 1300 only on one side of the treadmill, or there may be a pair of power rails positioned on opposing sides of the treadmill to provide power to both sides of the slat lighting.

In other embodiments, only some of the slats forming the tread 102 may include a contactor 1208. In such embodiments, the slats including the contactor 1208 may be electrically connected to slats not including the contactor 1208 using one or more conductors 1210 (shown in FIG. 12). The conductor 1210 may be in electrical communication with the contactor 1208. The conductor 1210 can include a jumper wire or any other electrical connector. The conductor 1210 supplies power from the contactor 1208 in contact with the power rail 1300 to lights 1206 attached to slats 1200 that do not include contactors 1208. In other words, the lights 1206 connected to slats other than the slat including the contactor 1208 may receive power from the conductor 1210 in response to the contactor 1208 contacting the power rail 1300. In this configuration, the number of slats 1200 including contactors 1208 may be reduced. For example, if the tread 102 includes 64 slats connected in series, one of every 32 slats in the series may include a contactor 1208 such that one contactor 1208 is always in contact with the power rail 1300 as the tread 102 rotates around the front and rear axles. In this example, the lights 1206 attached to the 62 slats that do not include a contactor 1208 may be powered by the conductor 1210. The contactor 1208 and the conductor 1210 may power the lights 1206 attached to each slat 1200 to illuminate the front, rear, and middle portions of the treadmill 100.

Figure 14:
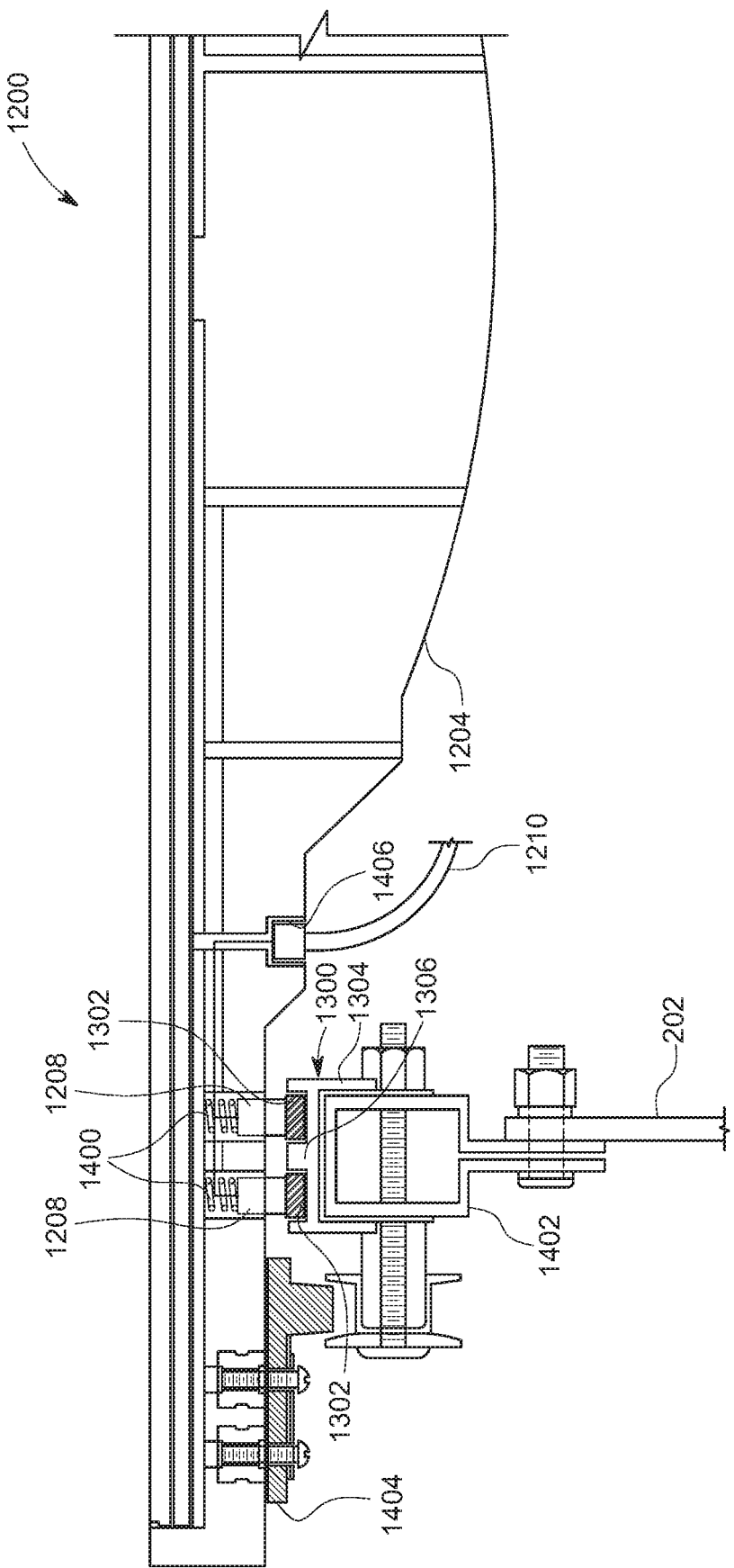
FIG. 14 is a partial rear view of the slat including a contactor contacting the power rail according to one embodiment.

FIG. 14 is a partial rear view of the slat 1200 including the contactor 1208 contacting the power rail 1300 according to one embodiment. In the illustrated, non-limiting example, two contactors 1208 are attached to the underside 1204 of the slat 1200. One end of each contactor 1208 is in contact with the strips of conductive material 1302 of the power rail 1300. The opposite end of each contactor 1208 includes an actuator 1400 (e.g., spring) configured to maintain contact between the contactor 1208 and the strip of conductive material 1302. The strips of conductive material 1302 are connected to the insulator member 1304. The wall 1306 separates and insulates the strips of conductive material 1302 from each other. The insulator member 1304 is connected to a bearing support 1402. The bearing support 1402 may support bearings (not shown) configured to enable rotation of the belt 1404 around the front and rear axles. One end of the slat 1200 is connected to the belt 1404. Another belt (not shown) may be connected to the slat 1200 at the opposite end of the slat 1200. The bearing support 1402 is connected to the frame 202. The conductor 1210 is connected to the underside 1204 of the slat 1200 in a recess 1406.

Figure 15:
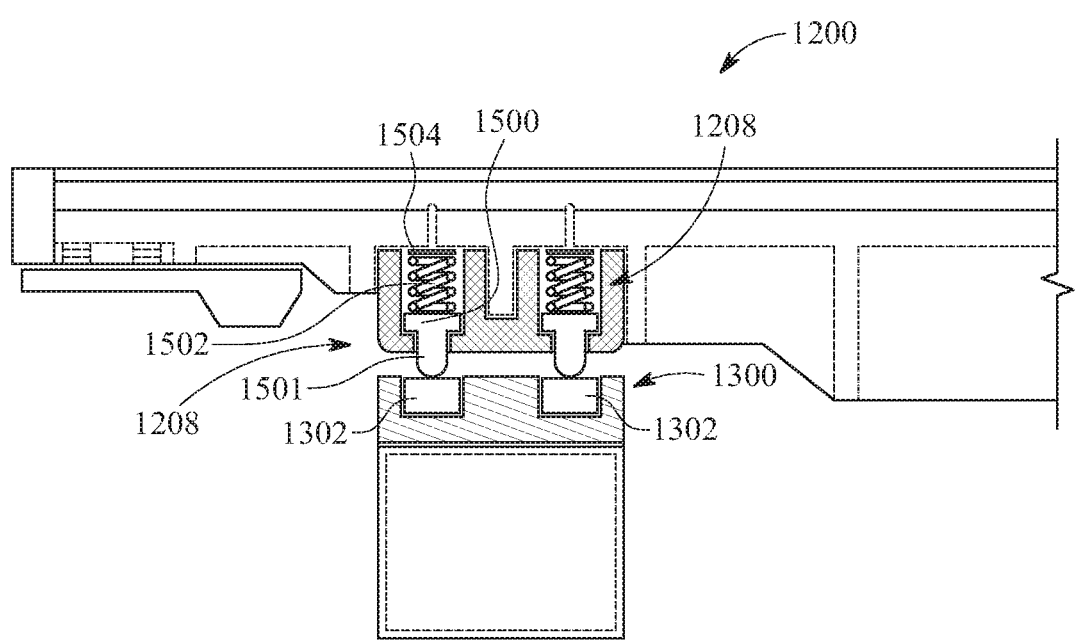
FIG. 15 is a rear view of a portion of the slat including two of the contactors contacting the power rail according to another embodiment.

FIG. 15 is a rear view of a portion of the slat 1200 including two contactors 1208 contacting the power rail 1300 according to another embodiment. Two are illustrated, although one or more contactors may be used. In the illustrated, non-limiting example, each of the contactors 1208 includes a contact 1500 made of a conductive material. Each of the contacts 1500 includes a protrusion 1501 configured to contact the strip of conductive material 1302 as the slat 1200 rotates around the front and rear axles. The contact 1500 is configured to receive power from the conductive material 1302. Each of the contactors 1208 includes an actuator 1502 (e.g., a compression spring) configured to apply a force to the contact 1500. The force applied to the contacts 1500 by each of the actuators 1502 allows the contacts 1500 to maintain electrical communication with the conductive material 1302. Each of the actuators 1502 receives power from the contacts 1500 and transmits the power to a washer 1504 (e.g., a nickel-plated copper washer). Each of the washers 1504 is configured to transmit the power received from the actuator 1502 to the lights 1206 via wiring (not shown). In other embodiments, the washers 1504 may include a plate or any other structure made of any conductive material.

Figure 16:
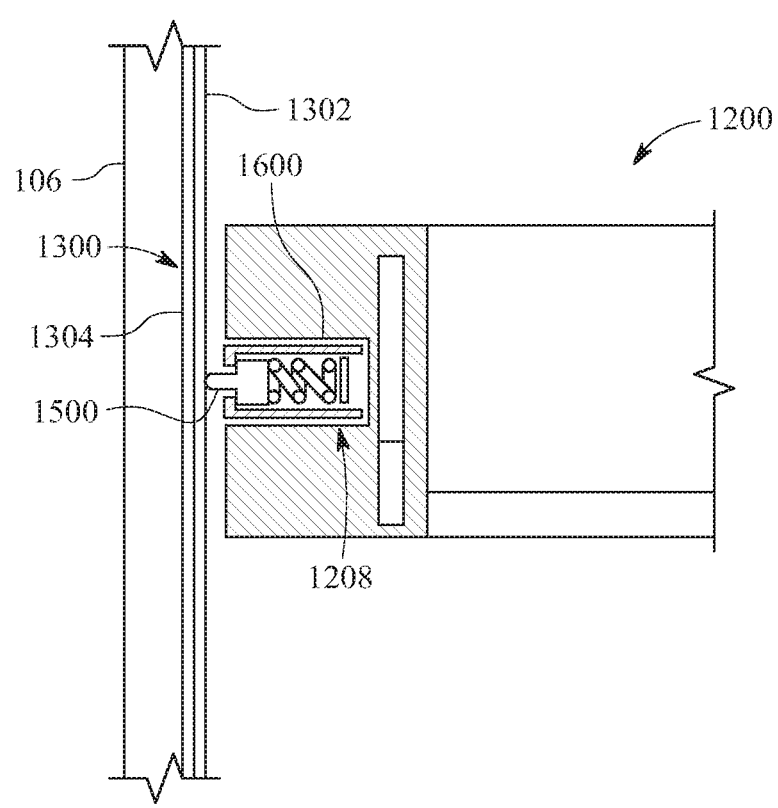
FIG. 16 is a is a top, partial cross-sectional view of a portion of the slat according to another embodiment.

FIG. 16 is a top, partial cross-sectional view of a portion of the slat 1200 according to another embodiment. In the illustrated, non-limiting embodiment, the treadmill 100 may include two power rails 1300. Each of the power rails 1300 is attached to one of the side rails 106 on opposing sides of the tread 102. Only one side of the slat 1200 and one of the power rails 1300 is shown in FIG. 16 for clarity. Each of the power rails 1300 includes at least one strip of conductive material 1302 and an insulator member 1304 disposed around at least a portion of the conductive material 1302. Each of the power rails 1300 is configured to receive one contactor 1208 (e.g., one contactor 1208 for conducting a positive charge and one contactor 1208 for conducting a negative charge). One of the contactors 1208 described with respect to FIG. 15 is attached to each longitudinal end of the slat 1200 within a recess 1600 defined by the slat 1200. The contact 1500 of each contactor 1208 maintains electrical communication with the conductive material 1302 of a respective power rail 1300 as the tread 102 rotates around the front and rear axles.

Figure 17:
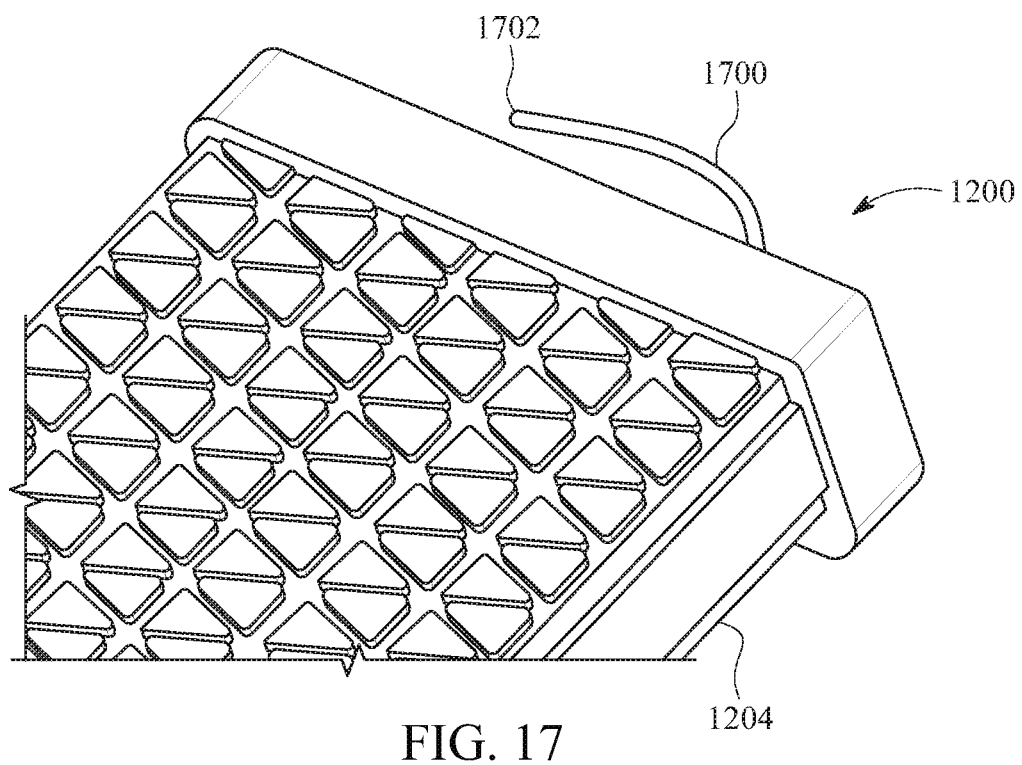
FIG. 17 is a top perspective view of a portion of the slat according to another embodiment.

FIG. 17 is a top perspective view of a portion of the slat 1200 according to another embodiment. In the illustrated, non-limiting embodiment, the slat 1200 includes a spring contact 1700 extending from each longitudinal end of the slat 1200 instead of the contactors 1208 described with respect to FIGS. 12 and 14-16. Only one spring contact 1700 and one longitudinal end of the slat 1200 are shown in FIG. 17 for clarity. Each of the spring contacts 1700 is made of a conductive material and is configured to transmit power from the power rails 1300 (not shown) described with respect to FIG. 16 to the lights 1206. In other embodiments, the spring contacts 1700 may extend from the underside 1204 of the slat 1200 and may be configured to transmit power from the power rails 1300 described with respect to FIG. 14 to the lights 1206. Each of the spring contacts 1700 includes a wire configured to maintain contact and electrical communication with a respective power rail 1300 while the tread 102 rotates around the front and rear axles. For example, each of the spring contacts 1700 can act as a compression spring such that a distal end 1702 of each of the spring contacts 1700 exerts a force on the respective power rail 1300 while the tread 102 rotates around the front and rear axles.

Figure 18:
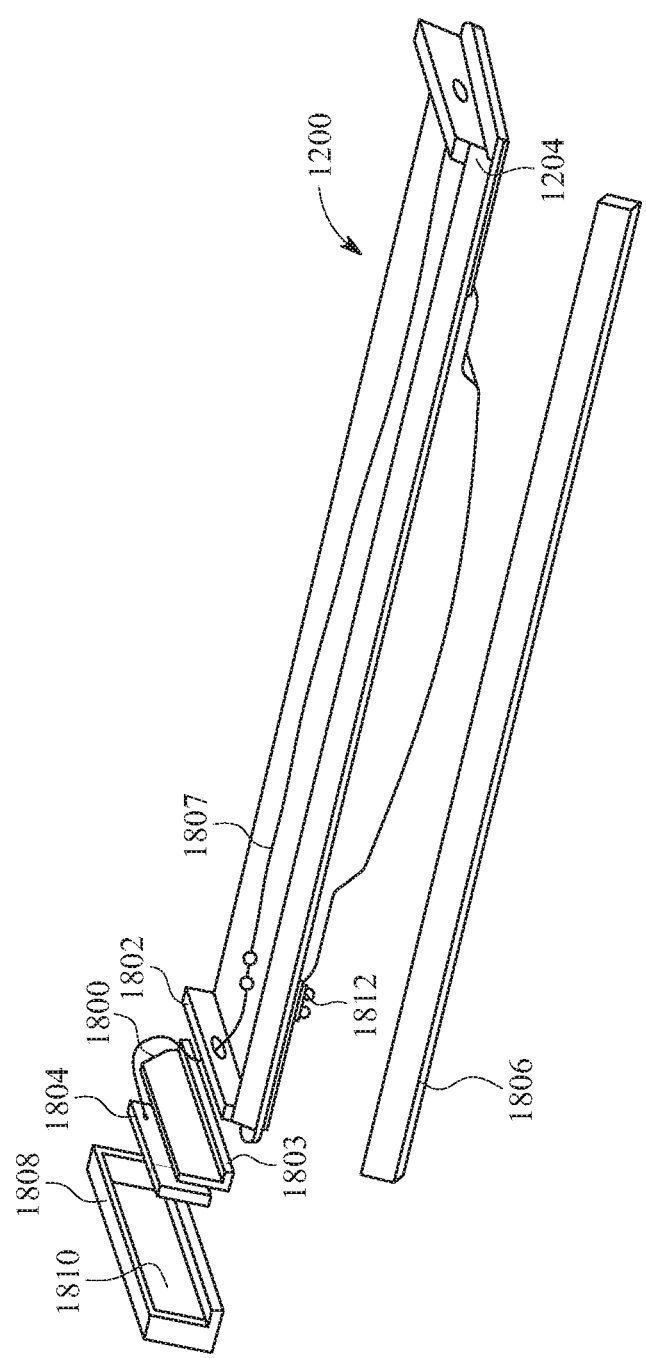
FIG. 18 is an exploded view of a portion of the slat according to another embodiment.

FIG. 18 is an exploded view of a portion of the slat 1200 according to another embodiment. The slat 1200 of FIG. 18 is shown without the tread surface 1202 for clarity. A first slat lens 1800 is attached to an end portion 1802 of the slat 1200. The first slat lens 1800 may be, for example, a light guide and include a transparent or semi-transparent member configured to receive light from a light 1804 and to emit the light to a second slat lens 1806. The first slat lens 1800 may be made of any plastic such as acrylic, glass, or any other material configured to refract light emitted by the light 1804. The first slat lens 1800 may have a rectangular shape, a cylindrical shape, a tubular shape, or any other shape and may extend along any width of the slat 1200. The first slat lens 1800 may include one or more protrusions 1803 configured to attach the first slat lens 1800 to the slat 1200.

The light 1804 is attached to a side of the first slat lens 1800 opposite the end portion 1802 of the slat 1200. In other embodiments, the light 1804 may be disposed between the end portion 1802 and the first slat lens 1800. The light 1804 may include features similar to those of the lights 1206. The light 1804 may include a controller configured to control the activation, deactivation, color, brightness, and/or light emission frequency of the light 1804 or may be controlled by the controller 314. The light 1804 is in electrical communication with the contactors 1208 via wiring 1807. An end cap 1808 is configured to attach to the end portion 1802 of the slat 1200 and is configured to enclose the light 1804 and the first slat lens 1800. The end cap 1808 includes a recess 1810 in which the first slat lens 1800 and the light 1804 are disposed while the end cap 1808 is attached to the slat 1200. The end cap 1808 may be made of an opaque material such that light emitted by the light 1804 is not visible to the user through the end cap 1808 or may be made of a transparent material such that light emitted by the light 1804 is visible to the user through the end cap 1808. One first slat lens 1800, one light 1804, and one end cap 1808 may be attached to each longitudinal end of the slat 1200, but only one of each are shown in FIG. 18 for clarity.

The second slat lens 1806 is attached to the front surface (leading edge) of the underside 1204 of the slat 1200, but in other embodiments may be attached to the back surface of the underside 1204 or to any other portion of the slat 1200. The tread surface 1202 may overhang the leading edge or may be flush with the leading edge. The second slat lens 1806 may be, for example, a light pipe and include a transparent or semi-transparent member configured to receive light from the first slat lens 1800 and to emit the light between adjacent slats 1200 forming the tread 102. The second slat lens 1806 may be made of any plastic such as acrylic, glass, or any other material configured to refract light emitted by the light 1804. The second slat lens 1806 may have a rectangular shape, a cylindrical shape, a tubular shape, or any other shape and may extend along any length of the slat 1200. When activated, light emitted by the light 1804 is refracted through the first slat lens 1800 and the second slat lens 1806 such that the light is emitted between adjacent slats.

One or more of the slats 1200 may include one or more brushes 1812 attached to the underside 1204 of the slat 1200. In the illustrated, non-limiting embodiment, two brushes 1812 are attached to a bottom surface of the slat 1200. Each of the brushes 1812 is configured to contact the conducive material 1302 of the power rail 1300 as the slat 1200 rotates around the treadmill. The contact between the brushes 1812 and the conductive material 1302 cleans dirt, dust, contamination, and/or debris from the conductive material such that electrical communication is maintained between the contactors 1208 and the power rail 1300. At least one brush 1812 may be located on the underside 1204 of the slat 1200 adjacent to each contactor 1208. In other embodiments, the brushes 1812 may be located on any portion of the slat 1200 so long as they contact the power rail. Each brush 1812 may be located upstream or downstream of a contactor 1208. In some embodiments, multiple brushes 1812 may contact one strip of conductive material 1302. In embodiments where the power rail 1300 is located to the side of the slats 1200, one or more brushes 1812 may be located on one or more sides of the slats 1200. Each slat 1200 may include one or more brushes 1812, but in other embodiments only one slat 1200 may include one or more brushes 1812, or brushes 1812 may be located on slats (e.g., two slats) 1200 periodically spaced along the tread.

The treadmill 100 may include a combination of stationary lighting located in the cavity 1000 and lights 1206 attached to the underside 1204 of slats 1200. As previously described, the lighting system may include a first set of lights configured to illuminate a front portion of the treadmill 100, a second set of lights configured to illuminate a rear portion of the treadmill 100, and a third set of lights to illuminate a middle portion of the treadmill 100. Any of first set of lights, the second set of lights, or the third set of lights may include embodiments of the lighting system described with respect to FIGS. 9-18 in any combination. For example, the first set of lights may include the first lens 902 extending around the front axle drum 304 and the lights 900 attached to the lens 902 as previously described. The second set of lights may include the second lens extending around the rear axle drum 306 and the lights attached to the second lens as previously described. The third set of lights may include the lights 1206 attached to the slats 1200 forming the tread 102. The power rail 1300 may extend along a length of the middle portion of the treadmill 100 such that the lights 1206 are only powered to emit light as they rotate through the middle portion of the treadmill 100 along a top of the cavity 1000. In this configuration, the lights 1206 are not powered as the slats 1200 are rotated through the front and rear portions of the treadmill. In other embodiments, the power rail 1300 may also be positioned such that the lights 1206 are only powered as the slats 1200 are rotated through the front and/or rear portions of the treadmill. Alternatively, the lights 1206 may be controlled by the controller 314 to emit light in response to the controller 314 determining that the lights 1206 are located in the middle portion of the treadmill 100. In another example, the third set of lights may include the lights 1100 attached to cross members 1102 within the cavity 1000 such that the lights 1100 emit light between adjacent slats to illuminate the middle portion of the treadmill 100.

The lighting systems described herein can be used in many different ways, some of which are described here. For example, the lights may be turned on when the proximity sensor detects a person approaching the treadmill 100. The lights may be controlled to flash as a warning to the approaching person. The lights may be turned on and to a color such as green inviting the approaching person to use the treadmill 100. The lighting systems may be used while the treadmill is in operation. The lights may be used while the tread is rotating to warn others around the treadmill that the tread is moving. The lights may be used to vary color in response to the user's temperature as measured by the non-contact temperature sensor or may represent values of other biometrics of the user. The lights may be used to indicate the speed of the tread. The lights may be used to indicate a safe region on the tread for which the user to stay when exercising.

Some or all of the lighting systems herein can be used with other machines such as moving escalators or moving sidewalks. The lighting herein can be modified for use with exercise bikes, rowing machines and stair climbers, as non-limiting examples.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the controller 314 and any other controller described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. The terms "signal" and "data" are used interchangeably. Further, portions of the controller 314 or any other described controller do not necessarily have to be implemented in the same manner.

Further, in one aspect, for example, the controller 314 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A lighting system for a treadmill, the treadmill including a tread that rotates around a front axle and a rear axle, wherein the tread comprises slats each having a tread surface and an underside, the lighting system comprising:
a light positioned on at least one slat, wherein the light is configured to emit light between adjacent slats; and
a controller in communication with the light and configured to control the light.

2. The lighting system of claim 1, comprising a biometric sensor located on the treadmill and configured to measure biometric information associated with a user, wherein the controller is configured to control at least one of a color, brightness, or light emission frequency of the light in response to receiving a signal from the biometric sensor.

3. The lighting system of claim 2, wherein the biometric sensor is an infrared temperature sensor that reads a body temperature of the user without contact.

4. The lighting system of claim 1, further comprising a proximity sensor located on the treadmill and configured to detect a user approaching the treadmill, wherein the controller is configured to activate the light in response to receiving a signal from the proximity sensor.

5. The lighting system of claim 1, wherein the light is multiple lights, each of the multiple lights positioned on a respective slat and configured to emit light between the adjacent slats.

6. The lighting system of claim 1, wherein the light is one or more of an LED, a light pipe, a light guide and a light rope.

7. The lighting system of claim 1, comprising:
a power rail positioned within the treadmill and extending along a length of the tread, wherein the power rail receives power from a power source;
a contactor attached to the underside of the slat on which the light is positioned, the power rail positioned such that the contactor contacts the power rail while the tread rotates, the contactor configured to supply power to the light when in contact with the power rail.

8. The lighting system of claim 7, wherein each slat includes a light attached to a leading edge of the slat and a contactor attached to the underside of the slat, and wherein the power rail is positioned at each end of the treadmill and configured to supply power to each light as the contactor contacts the power rail, resulting in each end of the treadmill continuously having light emitted between adjacent slats when the slats pass over the power rail.

9. The lighting system of claim 7, further comprising:
a brush attached to the underside of at least one slat, the brush positioned and configured to sweep the power rail as the tread rotates, thereby removing debris from the power rail.

10. The lighting system of claim 7, wherein the power source is a battery configured to wirelessly provide power to the power rail.

11. The lighting system of claim 8, wherein the controller is configured to individually control at least one of a color, brightness, or light emission frequency of each light attached to each slat individually with respect to the other lights.

12. A lighting system for a treadmill having a tread comprising slats each having a tread surface, a leading edge and an underside, each slat attached at longitudinal ends to a respective belt that rotates on bearings around a front axle and a rear axle, the lighting system comprising:
a light attached to the leading edge of a respective slat such that each slat has a light and the light emits light between adjacent slats; and
a controller in communication with each light and configured to control at least one of on/off, color, brightness, and light emission frequency of each light.

13. The lighting system of claim 12, further comprising:
a power rail positioned within the treadmill and extending along at least a portion of a length of the tread, wherein the power rail receives power from a power source;
a contactor attached to the underside of each slat, the power rail positioned such that each contactor contacts the power rail while the tread rotates, the contactor configured to supply power to the light when in contact with the power rail.

14. The lighting system of claim 13, wherein the power rail is positioned to illuminate a front portion or a rear portion of the treadmill, the power rail extending around a portion of a circumference the front axle or the rear axle.

15. The lighting system of claim 14, wherein the power rail is further positioned to illuminate a mid-section of the treadmill, the controller configured to control lights to illuminate the front portion or the rear portion of the treadmill in yellow light and the mid-section of the treadmill in green light.

16. The lighting system of claim 13, further comprising:
a brush attached to the underside of at least one slat, the brush positioned and configured to sweep the power rail as the tread rotates, thereby removing debris from the power rail.

17. The lighting system of claim 13, further comprising:
an actuator positioned between each contactor and a respective underside, the actuator configured to bias the contactor toward the power rail to maintain constant contact between the contactor and the power rail as the tread moves.

18. The lighting system of claim 12, wherein each light is one or more LEDs and a light pipe.

19. The lighting system of claim 12, wherein each light is a light rope.

* * * * *